United States Patent
Lee

(10) Patent No.: US 11,403,167 B2
(45) Date of Patent: Aug. 2, 2022

(54) APPARATUS AND METHOD FOR SHARING DATA IN A DATA PROCESSING SYSTEM

(71) Applicant: SK hynix Inc., Icheon-si (KR)

(72) Inventor: Joung Young Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/147,157

(22) Filed: Jan. 12, 2021

(65) Prior Publication Data

US 2022/0050741 A1 Feb. 17, 2022

(30) Foreign Application Priority Data

Aug. 13, 2020 (KR) .................. 10-2020-0101705

(51) Int. Cl.
*H03M 13/00* (2006.01)
*G06F 11/10* (2006.01)
*G06F 3/06* (2006.01)

(52) U.S. Cl.
CPC ........ *G06F 11/1004* (2013.01); *G06F 3/0607* (2013.01); *G06F 3/0623* (2013.01); *G06F 3/0658* (2013.01); *G06F 3/0679* (2013.01); *G06F 11/1008* (2013.01)

(58) Field of Classification Search
CPC .... G06F 3/0607; G06F 3/0623; G06F 3/0658; G06F 3/0679; G06F 7/588; G06F 11/1004; G06F 11/1008; G06F 12/0246; G06F 12/1027; G06F 2212/7201; G06F 2212/7202

USPC .................................. 714/758, 807
See application file for complete search history.

(56) References Cited

U.S. PATENT DOCUMENTS

| | | |
|---|---|---|
| 9,378,135 B2 | 6/2016 | Bennett |
| 10,157,004 B2 | 12/2018 | Michaeli |
| 10,229,051 B2 | 3/2019 | Hwang |
| 2010/0086126 A1* | 4/2010 | Yokota .................... H04L 9/003 708/250 |
| 2012/0210041 A1* | 8/2012 | Flynn .................... G06F 3/0656 711/3 |
| 2014/0164785 A1* | 6/2014 | Ochiai .................. H04L 9/3271 713/189 |
| 2015/0324613 A1 | 11/2015 | Park et al. |
| 2016/0085692 A1* | 3/2016 | Kwok ................. G06F 12/1408 713/193 |
| 2017/0192902 A1* | 7/2017 | Hwang ............... G06F 12/0246 |
| 2019/0012094 A1* | 1/2019 | Li ........................... G06F 12/10 |
| 2020/0201785 A1* | 6/2020 | Hanna ................. G06F 11/1004 |
| 2020/0226070 A1* | 7/2020 | Byun .................. G06F 12/0246 |
| 2021/0240608 A1* | 8/2021 | Jean .................... G06F 12/1408 |

* cited by examiner

*Primary Examiner* — Albert Decady
*Assistant Examiner* — Enamul M Kabir
(74) *Attorney, Agent, or Firm* — Weaver Austin Villeneuve & Sampson LLP

(57) ABSTRACT

A controller is coupled to a non-volatile memory device and a host. The controller is configured to perform a cyclic redundancy check on map data associated with user data stored in the memory device, generate an encryption code based on a logical address included in the map data, generate encrypted data through a logical operation on the encryption code and the map data, and transmit the encrypted data to the host.

17 Claims, 14 Drawing Sheets

APPARATUS AND METHOD FOR SHARING DATA IN A DATA PROCESSING SYSTEM

CROSS-REFERENCE TO RELATED APPLICATIONS

This patent application claims to the benefit of Korean Patent Application No. 10-2020-0101705, filed on Aug. 13, 2020, the entire disclosure of which is incorporated herein by reference.

TECHNICAL FIELD

Embodiments of this disclosure relate to memory systems and data processing systems including the memory system, and more particularly, to method and apparatus for sharing data generated in the memory system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, an exemplary data storage device may be any one or more of a USB (Universal Serial Bus) memory device, a memory card having various interfaces, a solid state drive (SSD) or the like.

BRIEF DESCRIPTION OF THE DRAWINGS

The description herein makes reference to the accompanying drawings wherein like reference numerals refer to like parts throughout the figures.

Figure 1:
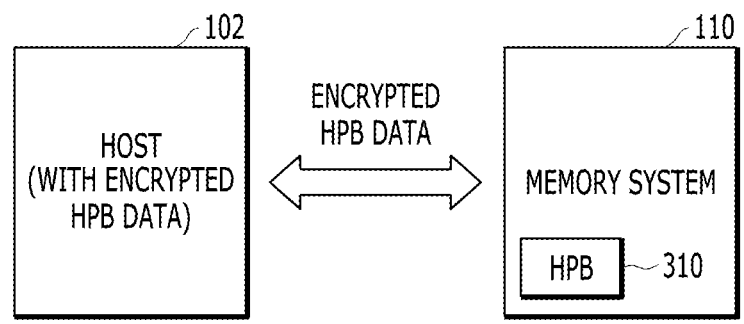
FIG. 1 is a high level block diagram depicting a host and a memory system in a data processing system according to an exemplary embodiment of the disclosure.

It is noted that reference to "an embodiment," "another embodiment" or the like does not necessarily mean only one embodiment, and different references to any such phrase are not necessarily to the same embodiment(s).

DETAILED DESCRIPTION

Various embodiments of the disclosure are described below with reference to the accompanying drawings. Elements and features of the disclosure, however, may be configured or arranged differently to form other embodiments, which may be variations of any of the disclosed embodiments. Thus, the present teachings are not limited to the embodiments set forth herein. Rather, the described embodiments are provided so that this disclosure is thorough and complete and fully conveys the scope of the disclosure to those skilled in the art to which the present teachings pertain.

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the present teachings.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting. As used herein, singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the disclosure. The teachings disclosed herein may be practiced without some or all of these specific details. In other instances, well-known process structures and/or processes have not been described in detail in order not to unnecessarily obscure the teachings disclosed herein.

It is also noted, that in some instances, as would be apparent to those skilled in the relevant art, a feature or element described in connection with one embodiment may be used singly or in combination with other features or elements of another embodiment, unless otherwise specifically indicated.

An embodiment of the disclosure can provide a data processing system and a method for operating the data processing system, which includes components and resources such as a memory system and a host, and is capable of dynamically allocating plural data paths used for data communication between the components based on usages of the components and the resources.

In addition, an embodiment of the disclosure can provide a method and an apparatus for improving or enhancing operations or performance of the memory system. While the memory system in the data processing system transmits map information to the host or a computing device, the host or the computing device can transmit a request (or a command) including a specific item recognized from the map information. Because the specific item is delivered along with the request transmitted from the host to the memory system, the memory system can reduce a time spent on address translation for an operation corresponding to the request.

In addition, according to an embodiment of the disclosure, a memory system included in a data processing system can transmit map data or map information to a host or a computing device, and the host or the computing device can transmit a request with the map data or the map information to the memory system, so that the data processing system has improved performance (e.g., increased input/output (I/O) throughput).

Further, an embodiment of the disclosure may provide a method and an apparatus for enhancing security in the data processing system by encrypting the map data or the map information transmitted between the memory system and the host.

In a method and a device provided according to an embodiment of the disclosure, when the memory system encrypts the map data or the map information and transmits an encrypted data including the map data or the map information to the host, and later receives the encrypted data from the host, an error included in the map information can be checked by a process of decoding the encrypted data.

Further, a method and an apparatus according to an embodiment of the disclosure can improve an input/output performance of the memory system and performance of the data processing system by reducing overhead generated by the procedure of transmitting and receiving the encrypted data between the memory system and the host.

In an exemplary embodiment, a controller can be coupled to a non-volatile memory device and a host. The controller can be configured to perform a cyclic redundancy check on a map data chunk associated with a user data chunk stored in the non-volatile memory device, generate an encryption code based on a logical address included in the map data chunk, generate encrypted data through a logical operation on the encryption code and the map data chunk, and transmit the encrypted data to the host.

Herein, a chunk of data or a data chunk may be a sequence of bits. For example, the data chunk may include the contents of a file, a portion of the file, a page in memory, an object in an object-oriented program, a digital message, a digital scanned image, a part of a video or audio signal, or any other information which can be represented by a sequence of bits. According to an exemplary embodiment, the data chunk may include a discrete object. According to another exemplary embodiment, the data chunk may include a unit of information within a transmission packet between two different components.

By way of example but not limitation, the map data chunk can include a physical address indicating a location where the user data chunk is stored in the non-volatile memory device.

The encrypted data can include a result of the cyclic redundancy check, the logical address and the physical address, and the result of the cyclic redundancy check and the physical address are encrypted through the logical operation.

The encryption code can be generated through a process of randomizing the logical address, extracting first encryption data through a masking process performed on the logical address and performing a logical operation on the first encryption data and second encryption data which is a remaining part excluding the first encryption data extracted through the masking process.

The encrypted data can include time information associated with the map data chunk, the time information and the map data chunk are encrypted with the encryption code through the logical operation.

The controller can be configured to decrypt the encrypted data when receiving the encrypted data and the logical address input along with a read request from the host.

The controller can be configured to decrypt the encrypted data to determine both whether the encrypted data includes an error and whether the encrypted data is associated with the logical address.

In another embodiment, a controller can be coupled to a host. The controller can be configured to receive encrypted data input from the host, generate an encryption code based on a logical address input along with the encrypted data, perform a logical operation on the encryption code and the encrypted data to obtain a map data chunk, and perform a cyclic redundancy check on the map data chunk to determine whether the map data chunk is valid.

The map data chunk can include a physical address indicating a location where a user data chunk is stored in a non-volatile memory device, and the controller is configured to use the physical address to read the user data chunk and transfer the user data chunk to the host.

The encrypted data can include a result of the cyclic redundancy check, the logical address and the physical address, and the result of the cyclic redundancy check and the physical address are encrypted through the logical operation.

The encryption code can be generated through a process of randomizing the logical address, extracting first encryption data through a masking process performed on the logical address and performing the logical operation on the first encryption data and second encryption data which is a remaining part excluding the first encryption data extracted through the masking process.

The encrypted data can include time information regarding the map data chunk, the time information and the map data chunk are encrypted with the encryption code through the logical operation.

The controller can be configured to determine both whether the encrypted data includes an error and whether the encrypted data is associated with the logical address, through the cyclic redundancy check.

The controller can be configured to transmit the encrypted data, including a map data chunk associated with a user data chunk stored in a non-volatile memory device, to the host.

In another embodiment, a memory system can include a nonvolatile memory device storing a user data chunk; and a controller configured to encrypt a map data chunk including a physical address associated with the user data chunk stored in the non-volatile memory device and transmit to, or receive from, a host an encrypted data. The controller can be further configured to perform a cyclic redundancy check to determine whether the physical address corresponds to a logical address associated with the user data chunk.

The controller can include an encoder configured to perform a cyclic redundancy check on a map data chunk regarding a user data chunk stored in the non-volatile memory device, generate an encryption code based on a logical address included in the map data chunk, and generate encrypted data through a logical operation to the encryption code and the map data chunk. The controller can further include a decoder configured to generate an encryption code based on a logical address input along with the encrypted data, perform a logical operation on the encryption code and the encrypted data to obtain a map data chunk, and perform a cyclic redundancy check on the map data chunk.

The encoder and the decoder can be configured to randomize the logical address, extract first encryption data through a masking process performed on the logical address and perform the logical operation on the first encryption data and second encryption data which is a remaining part excluding the first encryption data extracted through the masking process, to generate the encryption code.

The encrypted data can include time information regarding the map data chunk, the time information and the map data chunk are encrypted with the encryption code through the logical operation.

The encrypted data can include a result of the cyclic redundancy check, the logical address and the physical address, and the result of the cyclic redundancy check and the physical address are encrypted through the logical operation.

The controller can be configured to, when receiving the encrypted data input along with a read request and the logical address from the host, perform an operation corresponding to the read request based on a physical address obtained from the encrypted data.

Embodiments of the disclosure will now be described with reference to the accompanying drawings, wherein like numbers reference like elements.

FIG. 1 is a high level block diagram of a host and a memory system in a data processing system according to an exemplary embodiment of the disclosure.

Referring to FIG. 1, the data processing system may include a memory system 110 and a host 102.

According to the embodiment, the host 102 is a kind of device that performs an operation corresponding to a user's request. The memory system 110 may be used to temporarily or permanently store information needed by or generated during the operation of the host 102. The memory system 110 and the host 102 may be electrically coupled to transmit and receive data, signals, commands, requests, and the like in a preset manner (e.g., a protocol). The memory system 110 and the host 102 will be described in detail with reference to FIGS. 2 to 4.

The host 102 and the memory system 110 may have different address schemes. Accordingly, in order to store a data chunk requested by the host 102 in a storage space including non-volatile memory cells in the memory system 110, the memory system 110 can perform address translation that engages a file system used by the host 102 and the storage space including the non-volatile memory cells. For example, a data address according to the file system used by the host 102 may be referred to as a logical address or a logical block address, and a data location in the storage space including the non-volatile memory cells within the memory system 110 may be called a physical address or a physical block address. When the host 102 transmits a logical address to the memory system 110 along with a read request, the memory system 110 can search for a physical address corresponding to the logical address and then read and output a data chunk stored in a location corresponding to that physical address. In this process, the address translation may be performed while the memory system 110 searches for a physical address corresponding to a logical address received from the host 102.

In response to a request transmitted from the host 102, the memory system 110 may perform a data input/output operation. For example, when the memory system 110 performs a read operation in response to a read request transmitted from an external device, a data chunk stored in a plurality of non-volatile memory cells may be transferred to the host 102. For the read operation, the memory system 110 may perform the address translation on a logical address received from the host 102 based on map data or mapping information, and then access the data chunk stored in a location corresponding to a physical address obtained by the address translation. Further, the memory system 110 may store a data chunk transmitted together with a write request transmitted by the host 102, in a plurality of non-volatile memory cells. After storing the data chunk in a plurality of non-volatile memory cells, the memory system 110 may generate or update map data or mapping information that associates a logical address corresponding to the data chunk with a physical address.

The memory system 110 may include a host performance booster (HPB) 310 to improve data input/output performance. The host performance booster HPB 310 can transmit map data or mapping information, which associates a logical address used in the host 102 with a physical address used in the memory system 110, to the host 102. If the host 102 stores the mapping information, the host 102 refers to the mapping information before the host 102 transmits a read request to the memory system 110. The host 102 can send a read request to the memory system 110, along with a physical address used in the memory system 110. When the memory system 110 uses the physical address received with the read request it need not perform address translation, and can retrieve a data chunk corresponding to the read request from non-volatile memory cells more quickly and output the data chunk to the host 102. The map data or the mapping information may be independently generated and used by the memory system 110 through an internal operation. However, when the map data or the mapping information can be shared with the host 102, data input/output performance of the memory system 110 may be improved.

When the mapping information used inside the memory system 110 is shared with the host 102 which is an external device, data security may be compromised. It is also possible that occur distortion or transformation of the mapping information may occur by an operation performed in the host 102. Accordingly, the host performance booster (HPB) 310 may encrypt the map data or the mapping information and transmit encrypted data to the host 102. The encryption of the mapping information therefore reduces the chances the host 102 may perform faulty operation.

When the memory system 110 transmits an encrypted HPB data chunk to the host 102, the host 102 may decode (i.e., decrypt) the data in order to use the encrypted HPB data chunk. For example, the mapping information may include a logical address and a physical address. When both the logical address and the physical address of the mapping information are encrypted, the host 102 may decode (i.e., decrypt) the encrypted mapping information to recognize the physical address associated with the logical address. When the host 102 and the memory system 110 transmit and receive the encrypted mapping information and decode the encrypted mapping information, the host 102 may encode (encrypt) and decode (decrypt) the mapping information. However, when the host 102 performs encoding and decoding in order to use mapping information that it does not need to use, more specifically, a physical address, overhead may be increased in data communication with the memory system 110. According to an embodiment, the host 102 may not perform a decoding operation for the encrypted mapping information. In this embodiment, the host 102 can store the encrypted mapping information associated with a logical address, and transmits the encrypted mapping information to the memory system 110 along with the logical address.

Further, in an embodiment of the disclosure, the memory system 110 can encrypt only a part of the mapping information, so that the host 102 does not need to perform an encoding or decoding operation for the encrypted data. For example, before the memory system 110 transmits mapping information to the host 102, a physical address, without a logical address, of the mapping information may be encrypted. That is, the memory system 110 may partially encrypt the mapping information and transmit the partially encrypted data chunk to the host 102. Upon receiving the partially encrypted data input from the host 102, the memory system 110 may decode the partially encrypted data. In this case, the host 102 may not include a module, circuitry or etc. for performing an encoding/decoding operation for the mapping information, but the memory system 110 can include a module or circuitry for performing an encoding/decoding operation for the mapping information before/after interacting with the host 102. The security of data communication can be enhanced, while any distortion or deformation of the mapping information can be detected by the host 102.

When the logical address is not encrypted, the host 102 can readily recognize which logical address is associated with the partially encrypted data chunk transmitted from the memory system 110. Accordingly, when the partially encrypted data chunk is received from the memory system 110, the host 102 may store the corresponding information in an appropriate storage space of the host 102 since it readily detects that the partially encrypted data chunk is associated with a specific logical address. After the host 102 stores the partially encrypted data chunk associated with a specific logical address, the host 102 may transmit the partially encrypted data together with the logical address and a read request to the memory system 110.

As described above, the memory system 110 can encrypt a part of the mapping information so that the memory system 110 and the host 102 can transmit or receive partially encrypted data chunk associated with a specific logical address so as to improve data input/output performance of the memory system 110. According to this embodiment, therefore, when the mapping information is exchanged between the memory system 110 and the host 102, problems associated with the host 102 using the mapping information for a faulty operation may be avoided, and further the memory system 110 can recognize occurrence of distortion or deformation caused by the host 102 or by transmission between the memory system 110 and the host 102.

Figure 2:
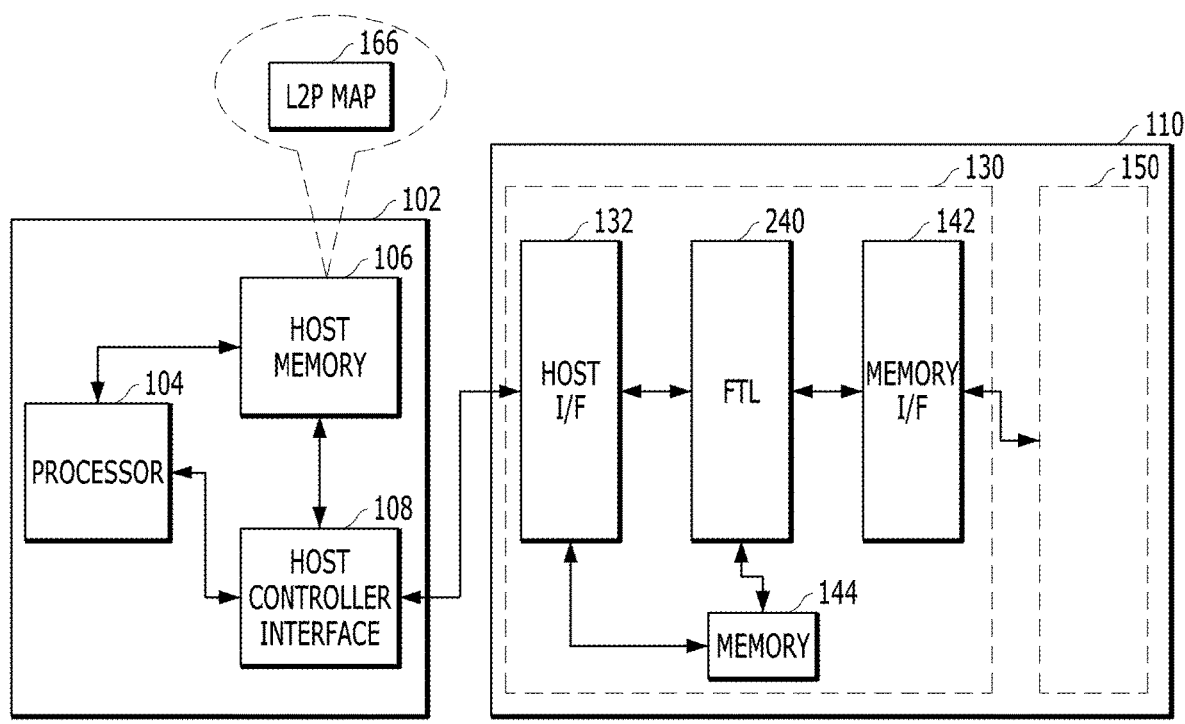
FIG. 2 shows block diagrams for exemplary embodiments of a host and a memory system in a data processing system according to an exemplary embodiment of the disclosure.

FIG. 2 shows block diagrams of exemplary embodiments for a host and a memory system in a data processing system according to an exemplary embodiment of the disclosure.

Referring to FIG. 2, the host 102 may include a processor 104, a host memory 106, and a host controller interface 108. The memory system 110 may include a controller 130 and a memory device 150. The controller 130 may include a host interface 132, a flash translation layer (FTL) 240, a memory interface 142 and a memory 144. According to an embodiment, the host performance booster (HPB) 310 may be included in the host interface 132 or the flash translation layer (FTL) 240.

Figure 3:
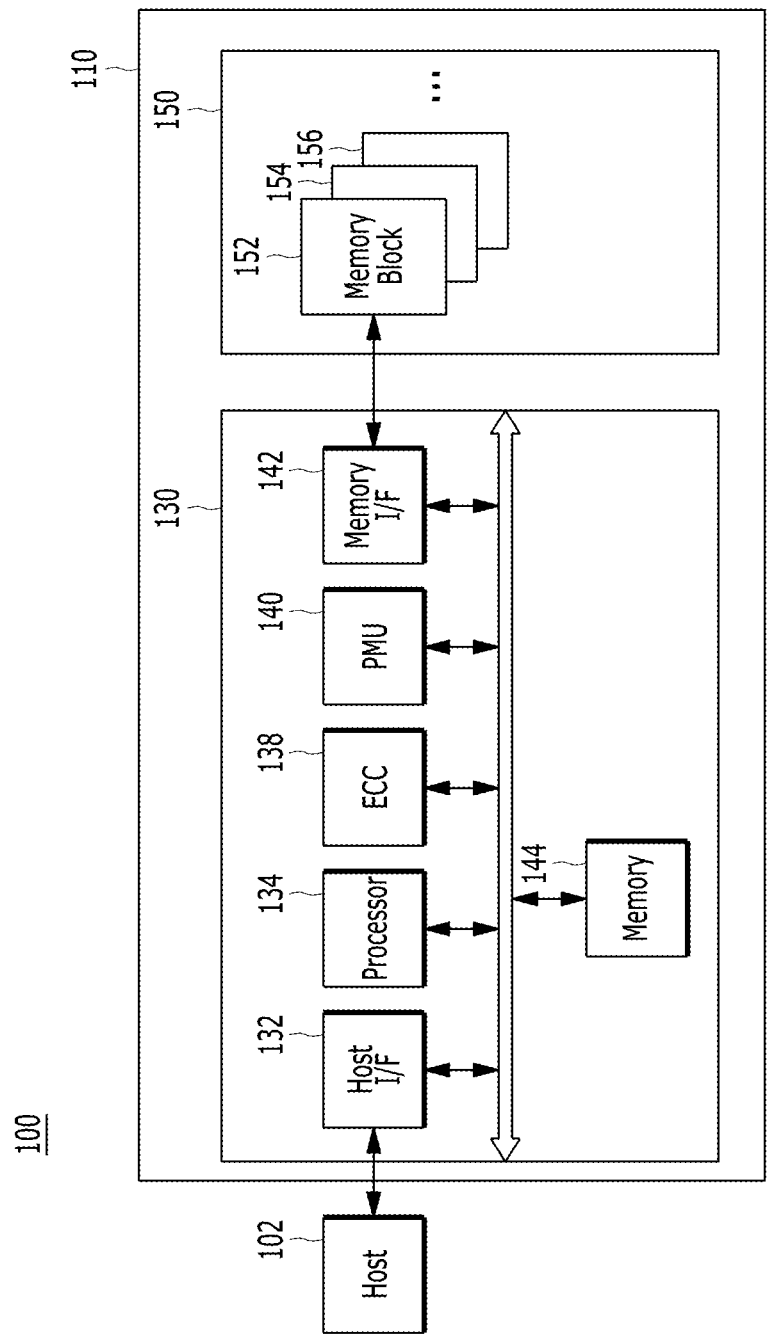
FIG. 3 shows an example of a data processing system including a memory system according to another exemplary embodiment of the disclosure.
Figure 4:
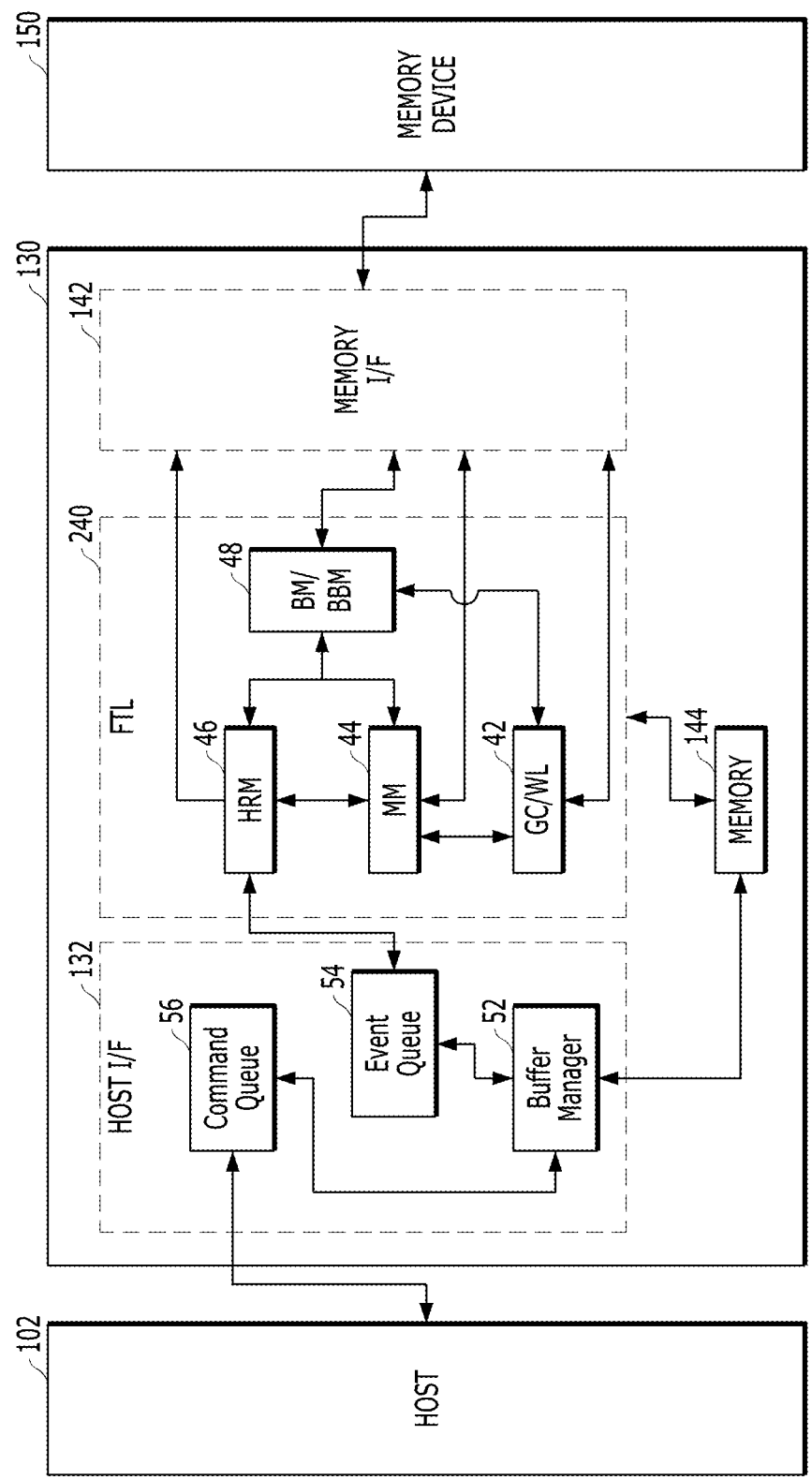
FIG. 4 illustrates an example of a data processing system including a memory system according to yet another embodiment of the disclosure.

The controller 130 and the memory device 150 described in FIG. 2 may correspond to the controller 130 and the memory device 150 described in FIGS. 3 to 4. Hereinafter, a difference between the controller 130 and the memory device 150 shown in FIG. 2 and the controller 130 and the memory device 150 shown in FIGS. 3 to 4, which can technically be distinguished, is mainly described.

The host 102 may include the processor 104, which has a higher performance than that of the memory system 110, and the host memory 106 which is capable of storing a larger amount of data than that of the memory system 110 that cooperates with the host 102. The processor 104 and the host memory 106 in the host 102 may offer advantages with respect to size or space and upgradability. For example, the processor 104 and the host memory 106 can have less space limitation than the processor 134 and the memory 144 in the memory system 110. The processor 104 and the host memory 106 can be replaceable for upgrading their performance, which is distinguishable from the processor 134 and the memory 144 in the memory system 110. In the embodiment, the memory system 110 can utilize the resources possessed by the host 102 in order to increase the operation efficiency of the memory system 110.

As an amount of data which can be stored in the memory system 110 increases, an amount of metadata corresponding to the data stored in the memory system 110 also increases. When storage capability used to load the metadata in the memory 144 of the controller 130 is limited or restricted, the increase in an amount of loaded metadata may cause an operational burden on operations of the controller 130. For example, because of limitation of space or region allocated for metadata in the memory 144 of the controller 130, a part, but not all, of the metadata may be loaded. If partially loaded metadata does not include a specific metadata for a physical location to which the host 102 is intended to access, the controller 130 stores the loaded metadata back into the memory device 150 if some of the loaded metadata has been updated, as well as load the specific metadata for the physical location to which the host 102 is intended to access. This allows the controller 130 to perform a read operation or a write operation required by the host 102, but may degrade performance of the memory system 110.

Storage capability of the host memory 106 included in the host 102 may be larger tens or hundreds of times than that of the memory 144 included in the controller 130. The memory system 110 may transfer metadata (L2P MAP) 166 used by the controller 130 to the host memory 106 so that at least some part of the host memory 106 may be accessed by the memory system 110. At least some part of the host memory 106 can be used as a cache memory for address translation required for reading or writing data in the memory system 110. Herein, the metadata 155 may include the encrypted HPB data chunk described in FIG. 1. In this case, the host 102 translates a logical address into a physical address based on the metadata 166 stored in the host memory 106 and then transmits the logical address along with a request, a command or an instruction to the memory system 110. The memory system 110, which receives the translated physical address with the request, the command or the instruction, may skip an internal process of translating the logical address into the physical address and access the memory device 150 based on the physical address it receives. In this case, overhead (e.g., an operational burden) associated with the controller 130 loading metadata from the memory device 150 for the address translation may be eliminated, and operational efficiency of the memory system 110 can be enhanced.

On the other hand, even if the memory system 110 transmits the metadata 166 to the host 102, the memory system 110 can control mapping information based on the metadata 166 such as metadata generation, erase, update and the like. The controller 130 in the memory system 110 may perform a background operation such as garbage collection and wear leveling according to an operation state of the memory device 150 and may determine a physical address, i.e., which physical location in the memory device 150 data transferred from the host 102 is stored. Because a physical address of data stored in the memory device 150 may be changed and the host 102 may not know the changed physical address, the memory system 110 may control the metadata 166 as described herein.

While the memory system 110 controls metadata used for the address translation, the memory system 110 may need to modify or update the metadata 166 previously transmitted to the host 102. The memory system 110 can send a signal or a metadata to the host 102 so as to request the update of the metadata 166 stored in the host 102. The host 102 may update the stored metadata 166 in the host memory 106 in response to a request delivered from the memory system 110. This allows the metadata 166 stored in the host memory 106 to be kept as the latest version such that, even though the host controller interface 108 uses the metadata 166 stored in the host memory 106, there is no problem when a logical address is translated into a physical address and the translated physical address is transmitted along with the logical address to the memory system 110.

Meanwhile, the metadata 166 stored in the host memory 106 may include an encrypted HPB data chunk associated with a logical address. According to an embodiment, the host 102 may not use the encrypted HPB data chunk for any purpose or operation other than an operation or the purpose of transmitting the encrypted HPB data chunk to the memory system 110.

According to an embodiment, metadata associating a logical address with a physical address in the memory system 110 may include two distinguishable items: a first mapping information item used for translating a logical address into a physical address, and a second mapping information item used for translating a physical address into a logical address. Among them, the metadata 166 stored in the host memory 106 may include the first mapping information. The second mapping information can be primarily used for internal operations of the memory system 110, but may or may not be used for operations requested by the host 102 to store data in the memory system 110 or read data corresponding to a particular logical address from the memory system 110. Depending on the embodiment, the second mapping information item may or may not be transmitted by the memory system 110 to the host 102.

Meanwhile, the controller 130 in the memory system 110 can control (e.g., create, delete, update, etc.) the first mapping information item or the second mapping information item, and store either the first mapping information item or the second mapping information item in the memory device 150. Because the host memory 106 may be a type of volatile memory, the metadata 166 stored in the host memory 106 may disappear when an event such as interruption of power supply occurs. Accordingly, the controller 130 in the memory system 110 may not only keep the latest state of the metadata 166 stored in the host memory 106 of the host 102, but may also store the latest state of the first mapping information item and/or the second mapping information item in the memory device 150.

FIG. 3 shows an example of a data processing system including a memory system according to an exemplary embodiment of the disclosure.

Referring to FIG. 3, the data processing system 100 may include a host 102 coupled to a memory system 110. For example, the host 102 and the memory system 110 can be coupled to each other via a data transmission means such as a data bus, a host cable and the like, to transmit or receive a data chunk.

The host 102 may comprise, for example, a portable electronic device such as a mobile phone, an MP3 player and a laptop computer, or a non-portable electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user's environment. But the enterprise operating systems can be specialized for securing and supporting high performance. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command received from the host 102. For example, the controller 130 may perform a read operation to provide a piece of data read from the memory device 150 for the host 102, and perform a write operation (or a program operation) to store a piece of data received from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, an error correction circuitry 138, a power management unit (PMU) 140, a memory interface 142, and a memory 144. Components included in the controller 130 described in FIG. 3 may vary according to an implementation form, an operation performance, or the like regarding the memory system 110. For example, the memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components in the controller 130 may be added or omitted based on implementation of the memory system 110.

The host 102 and the memory system 110 may include a controller or an interface for transmitting and receiving a signal, a piece of data, and the like, under a predetermined protocol. For example, the host interface 132 in the memory system 110 may include an apparatus capable of transmitting a signal, a piece of data, and the like to the host 102 or receiving information in the form of a signal, a piece of data, and the like transmitted by the host 102.

The host interface 132 included in the controller 130 may receive a signal, a command (or a request), or a piece of data transmitted by the host 102. That is, the host 102 and the memory system 110 may use a predetermined protocol to transmit and receive information between each other. Examples of protocols or interfaces supported by the host 102 and the memory system 110 for sending and receiving information may include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a kind of layer for exchanging a piece of data with the host 102 and is implemented with, or driven by, firmware called a host interface layer (HIL).

The Integrated Drive Electronics (IDE) or Advanced Technology Attachment (ATA), used as one of the interfaces for transmitting and receiving information, can use a cable including a plurality, e.g., 40, wires connected in parallel to support data transmission and reception between the host 102 and the memory system 110. When a plurality of memory systems 110 are connected to a single host 102, the plurality of memory systems 110 may be divided into a master or a slave by using a position or a dip switch to which the plurality of memory systems 110 are coupled. When the memory system 110 is set as the master it may be used as the main memory device. The IDE (ATA) has evolved into Fast-ATA, ATAPI, and Enhanced IDE (EIDE).

Serial Advanced Technology Attachment (SATA) is a kind of serial data communication interface that is compatible with various ATA standards of parallel data communication interfaces which is used by Integrated Drive Electronics (IDE) devices. The 40 wires in the IDE interface can be reduced to six wires in the SATA interface. For example, 40 parallel signals for the IDE can be converted into 6 serial signals for the SATA to be transmitted between each other. The SATA has been widely used because of its faster data transmission and reception rate and it uses less resources in the host 102 for data transmission and reception. The SATA may support connection to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely detached like an external hard disk.

The Small Computer System Interface (SCSI) is a kind of serial data communication interface used for connection between a computer, a server, and/or another peripheral device. The SCSI can provide a high transmission speed, as compared with other interfaces such as the IDE and the SATA. In the SCSI, the host 102 and at least one peripheral device (e.g., the memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. x1, x4, x8, x16, etc.), to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the nonvolatile memory system 110, such as an SSD, which operates at a higher speed than a hard disk.

According to an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 3, the error correction circuitry 138 can correct error bits of the data processed in (e.g., outputted from) the memory device 150, which may include an ECC encoder and an ECC decoder. Here, the ECC encoder can perform error correction encoding of data to be programmed in the memory device 150 to generate encoded data to which a parity bit is added, and store the encoded data in memory device 150. The ECC decoder can detect and correct errors contained in data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include any and all circuits, modules, systems or devices for performing the error correction operation based on at least one of the above described codes.

The power management unit (PMU) 140 may control electrical power provided in the controller 130. The PMU 140 may monitor the electrical power supplied to the memory system 110 (e.g., a voltage supplied to the controller 130) and provide the electrical power to components included in the controller 130. The PMU 140 can detect power-on or power-off, and can also generate a trigger signal to enable the memory system 110 to back up a current state urgently when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, to allow the controller 130 to control the memory device 150 in response to a command or a request received from the host 102. The memory interface 142 may generate a control signal for the memory device 150 and may process data inputted to, or outputted from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) as a component for exchanging data with the memory device 150.

According to an embodiment, the memory interface 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of, for example, 8-bit or 16-bit data. Data communication between the controller 130 and the memory device 150 can be achieved through at least one interface handling an asynchronous single data rate (SDR), a synchronous double data rate (DDR), and a toggle double data rate (DDR).

The memory 144 may be a sort of working memory in the memory system 110 or the controller 130, while storing temporary or transactional data required for operations in the memory system 110 and the controller 130. For example, the memory 144 may temporarily store a piece of read data outputted from the memory device 150 in response to a request from the host 102, before the piece of read data is outputted to the host 102. In addition, the controller 130 may temporarily store a piece of write data inputted from the host 102 in the memory 144, before programming the piece of write data in the memory device 150. When the controller 130 controls operations such as data read, data write, data program, data erase, etc., of the memory device 150, a piece of data transmitted or generated between the controller 130 and the memory device 150 of the memory system 110 may be stored in the memory 144. In addition to the piece of read data or write data, the memory 144 may store other information (e.g., map data, read requests, program requests, etc.) necessary for performing operations for inputting or outputting a piece of data between the host 102 and the memory device 150. According to an embodiment, the memory 144 may include a command queue, a program memory, a data memory, a write buffer/cache, a read buffer/cache, a data buffer/cache, a map buffer/cache, and the like.

In an embodiment, the memory 144 may be implemented with a volatile memory. For example, the memory 144 may be implemented with a static random access memory (SRAM), a dynamic random access memory (DRAM), or both. Although FIG. 3 illustrates, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request received from the host 102. According to an embodiment, the processor 134 may execute firmware to control the program operation or the read operation in the memory system 110. Herein, the firmware may be referred to as a flash translation layer (FTL). An example of the FTL is later described in detail. According to an embodiment, the processor 134 may be implemented with a microprocessor or a central processing unit (CPU).

Further, according to an embodiment, the memory system 110 may be implemented with at least one multi-core processor. The multi-core processor is a kind of circuit or chip in which two or more cores, which are considered distinct processing regions, are integrated. For example, when a plurality of cores in the multi-core processor drive or execute a plurality of flash translation layers (FTLs) independently, data input/output speed of the memory system 110 may be improved. According to an embodiment, the data input/output (I/O) control circuitry 198 and the information collection circuitry 192 described in FIG. 1 may be independently performed through different cores in the multi-core processor.

The processor 134 in the controller 130 may perform an operation corresponding to a request or a command received from the host 102. Further, the memory system 110 may be independent of a command or a request received from an external device such as the host 102. Typically, an operation performed by the controller 130 in response to the request or the command received from the host 102 may be considered a foreground operation, while an operation performed by the controller 130 independently (e.g., regardless of the request or the command received from the host 102) may be considered a background operation. The controller 130 can perform the foreground or background operation for read, write or program, erase and the like on data in the memory device 150. In addition, a parameter set operation corresponding to a set parameter command or a set feature command as a set command transmitted from the host 102 may be considered a foreground operation. Meanwhile, as a background operation without a command transmitted from the host 102, the controller 130 can perform garbage collection (GC), wear leveling (WL), bad block management for identifying and processing bad blocks, or the like may be performed, in relation to a plurality of memory blocks 152, 154, 156 included in the memory device 150.

According an embodiment, substantially similar operations may be performed as both the foreground operation and the background operation. For example, if the memory system 110 performs garbage collection in response to a request or a command received from the host 102 (e.g., Manual GC), garbage collection can be considered a foreground operation. However, when the memory system 110 may perform garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing of plural requests or commands received from the host 102 to improve performance of the memory system 110. For example, the transmitted requests or commands may be divided and processed simultaneously into a plurality of dies or a plurality of chips in the memory device 150. The memory interface 142 in the controller 130 may be connected to a plurality of dies or chips in the memory device 150 through at least one channel and/or at least one way. When the controller 130 distributes and stores pieces of data in the plurality of dies through each channel or each way in response to requests or a commands associated with a plurality of pages including nonvolatile memory cells, plural operations corresponding to the requests or the commands can be performed simultaneously or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state and/or an abnormal state. The controller's determination of which channel or way an instruction and/or a data is delivered through can be associated with a physical block address, e.g., which die(s) the instruction and/or the data is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction and/or data is exchanged via.

Referring to FIG. 3, the memory device 150 in the memory system 110 may include a plurality of memory blocks 152, 154, 156, etc. Each of the plurality of memory blocks includes a plurality of nonvolatile memory cells. According to an embodiment, memory blocks 152, 154, 156 can be a group of nonvolatile memory cells erased together. Memory blocks 152, 154, 156 may include a plurality of pages which is a group of nonvolatile memory cells read or programmed together. Although not shown in FIG. 3, each memory block 152, 154, 156 may have a three-dimensional stack structure for high integration. Further, the memory device 150 may include a plurality of dies, each die including a plurality of planes, each plane including the plurality of memory blocks 152, 154, 156. Configuration of the memory device 150 can be different depending on the desired performance of the memory system 110.

In the memory device 150 shown in FIG. 3, the plurality of memory blocks 152, 154, 156, etc. are included. The plurality of memory blocks 152, 154, 156 can be any of different types of memory blocks such as a single level cell (SLC) memory block, a multi-level cell (MLC) Cell) memory block or the like, according to the number of bits that can be stored or represented in one memory cell.

Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated for a given storage capacity. In an embodiment, the memory device 150 may be implemented with any one of MLC memory blocks such as a double level cell (DLC) memory block, a triple level cell (TLC) memory block, a quadruple level cell (QLC) memory block and/or any combination thereof. The double level cell (DLC) memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

According to an embodiment, the controller 130 may use a multi-level cell (MLC) memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

Further, according to an embodiment, the controller 130 may program pieces of data in a multi-level cell (MLC) a plurality of times without performing an erase operation on a specific MLC memory block included in the memory device 150. In general, nonvolatile memory cells have a feature that does not support data overwrite. However, the controller 130 may use a feature in which a multi-level cell (MLC) may store multi-bit data, in order to program plural pieces of 1-bit data in the MLC a plurality of times. For MLC overwrite operation, the controller 130 may store the number of program times as separate operation information when a piece of 1-bit data is programmed in a nonvolatile memory cell. According to an embodiment, an operation for uniformly levelling threshold voltages of nonvolatile memory cells can be carried out before another piece of data is overwritten in the same nonvolatile memory cells.

In an embodiment of the disclosure, the memory device 150 is embodied as a nonvolatile memory such as a flash memory examples of which include NAND flash memory, NOR flash memory and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

FIG. 4 illustrates an example of a memory system according to another exemplary embodiment of the disclosure.

Referring to FIG. 4, a controller 130 in a memory system in accordance with another embodiment of the disclosure is described. The controller 130 communicates with the host 102 and the memory device 150. As illustrated, the controller 130 includes a host interface 132, a flash translation layer (FTL) 240, as well as the host interface 132, the memory interface 142 and the memory 144 previously identified in connection with FIG. 2.

Although not shown in FIG. 4, in accordance with an embodiment, the ECC unit 138 described in FIG. 3 may be included in the flash translation layer (FTL) 240. In another embodiment, the ECC unit 138 may be implemented as a separate module, a circuit, firmware or the like, which is included in, or associated with, the controller 130.

The host interface 132 is for handling commands, data, and the like transmitted from the host 102. By way of example but not limitation, the host interface 132 may include a command queue 56, a buffer manager 52 and an event queue 54. The command queue 56 may sequentially store commands, data, and the like received from the host 102 and output them to the buffer manager 52 in, for example, the order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands and/or data of the same characteristic, e.g., read or write commands, may be transmitted from the host 102, or commands and data of different characteristics may be transmitted to the memory system 110 after being mixed or jumbled by the host 102. For example, a plurality of commands for reading data (read commands) may be delivered, or commands for reading data (read commands) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been entered from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 240. The event queue 54 receives events, entered from the buffer manager 52, which are to be internally executed and processed by the memory system 110 or the controller 130 in response to the commands, the data, and the like transmitted from the host 102, so as to deliver the events into the flash translation layer (FTL) 240 in the order received.

In accordance with an embodiment, the flash translation layer (FTL) 240 can include a host request manager (HRM) 46, a map manager (MM) 44, a state manager 42 and a block manager 48. The host request manager (HRM) 46 can manage the events entered from the event queue 54. The map manager (MM) 44 can handle or control map data. The state manager 42 can perform garbage collection (GC) or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page in the memory device 150, and then, can transmit a map update request corresponding to the program request to the map manager (MM) 44, to update an item relevant to the programmed data in the mapping table that maps the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a cache block is cleaned and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 might not perform the mapping table update. It is because the map request is issued with old physical information if the status manger 42 requests a map update and a valid page copy is completed later. The map manager 44 may perform a map update operation to ensure accuracy when the latest map table still points to the old physical address.

Figure 5:
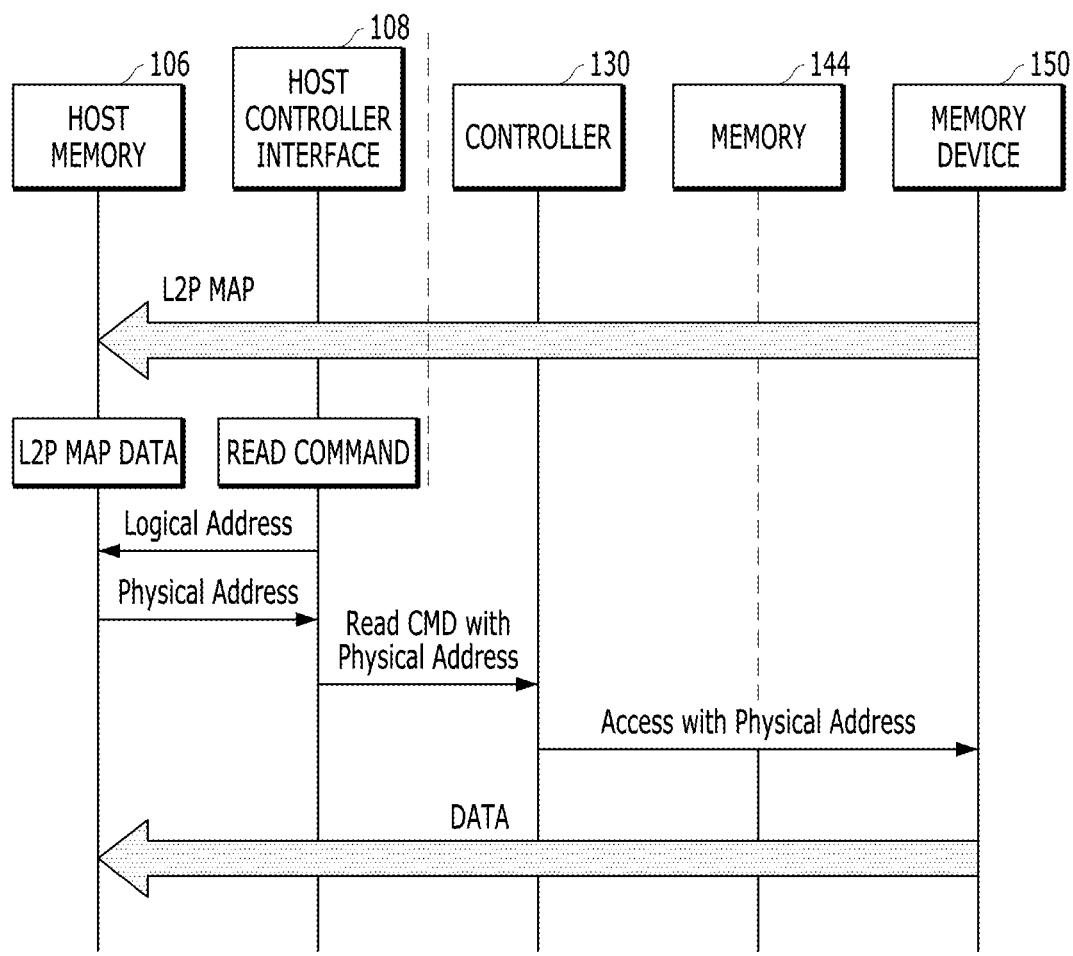
FIG. 5 illustrates a read operation performed by a host and a memory system in a data processing system according to an exemplary embodiment of the disclosure.

FIG. 5 illustrates a read operation performed in a host and a memory system in a data processing system according to an exemplary embodiment of the disclosure. Referring to FIGS. 2 and 5, an operation requested by the host 102 to read data stored in the memory system 110 is described when the metadata 166 is stored in the host memory 106 of the host 102.

Power is supplied to the host 102 and the memory system 110, and then the host 102 and the memory system 110 can communicate with each other. When the host 102 and the memory system 110 communicate, the metadata (L2P MAP) stored in the memory device 150 can be transferred to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the is metadata (L2P MAP) stored in the host memory 106. Based on the metadata (L2P MAP) stored in the host memory 106, the host controller interface 108 can recognize the physical address corresponding to the logical address. The host controller interface 108 carries out an address translation for the logical address associated with the read command.

The host controller interface 108 transfers the read command (Read CMD) with the logical address as well as the physical address into the controller 130 of the memory system 110. The controller 130 can access the memory device 150 based on the physical address entered with the read command. Data stored at a location corresponding to the physical address in the memory device 150 can be transferred to the host memory 106 in response to the read command (Read CMD).

An operation of reading data stored in the memory device 150 including a nonvolatile memory may take more time than an operation of reading data stored in the host memory 106 or the like which may be a volatile memory. In the above-described operation for handing the read command (Read CMD), the controller 130 may skip or omit an address translation corresponding to the logical address entered from the host 102 (e.g., searching for and detecting a physical address associated with the logical address). For example, in the address translation, the controller 130 might not have to load metadata from the memory device 150 or replace the metadata stored in the memory 144 when the controller 130 cannot find metadata for the address translation in the memory 144. This allows the memory system 110 to perform a read operation requested by the host 102 more quickly.

Referring to FIGS. 1 and 5, the controller 130 may encrypt a part of mapping information (L2P MAP) stored in the memory device 150. The controller 130 may encrypt the part of the mapping information (L2P MAP) to transmit a partially encrypted data chunk to the host 102 so that the partially encrypted data chunk can be stored in the host memory 106. The host memory 106 can store the partially encrypted data chunk. The host controller interface 108 can access the host memory 106, to obtain the partially encrypted data chunk associated with a logical address, and then transmit the partially encrypted data chunk with a read request (Read CMD) to the controller 130. The controller 130 may decode the encrypted transmission data and recognize a physical address associated with the logical address without performing an address translation. Hereinafter, the memory system 110 and the host 102 configured to transmit and receive an encrypted data chunk will be described in detail.

Figure 6:
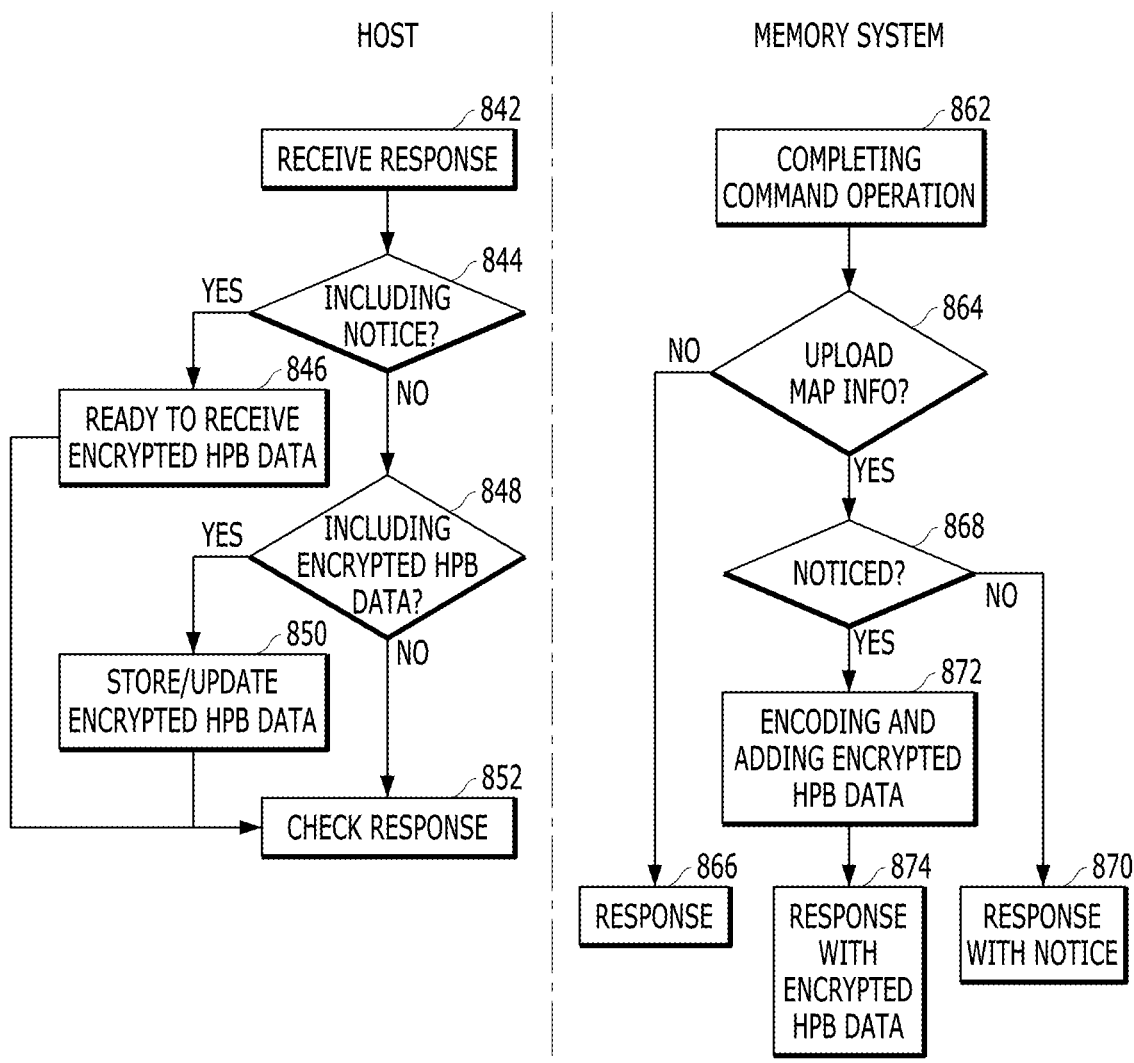
FIG. 6 illustrates an exemplary method of operation for determining and transmitting map information according to an exemplary embodiment of the disclosure.

FIG. 6 illustrates an example of a method for determining and transmitting map information according to an exemplary embodiment of the disclosure. In detail, FIG. 6 illustrates a case where the memory system attempts to transmit map information to the host while the host and the memory system are operatively engaged with each other.

Referring to FIG. 6, the memory system may determine whether an operation corresponding to a command transmitted from a host is completed (step 862). After the operation corresponding to the command is completed, the memory system may check whether there is map information to be transmitted to the host before transmitting a response corresponding to the command (step 864). If there is no map information to be transmitted to the host (NO in step 864), the memory system may transmit a response RESPONSE including information (e.g., success or failure) indicating whether the operation corresponding to the command sent from the host has completed (step 866).

When the memory system detects map information to be transmitted to the host (YES in step 864), the memory system may check whether a notice NOTICE for transmitting the map information has been made (step 868). The notification may be similar to that described below with reference to FIG. 13. When the memory system wants to send the map information but the notification regarding the memory system sending the map information to the host has not been made in advance (NO of step 868), the memory system can add the notice NOTICE to the response RESPONSE. In addition, the memory system may transmit the response RESPONSE with the notice NOTICE to the host (step 870).

When the notice NOTICE for inquiring transmission of the map information has already been made (YES at step 868), the memory system may encode (or encrypt) the map information and add encoded (or encrypted) map information to the response (step 872). Thereafter, the memory system may transmit a response including the encrypted HPB data chunk (step 874). In FIG. 6, after the memory system 110 performs an operation corresponding to a request received from the host 102, the memory system 110 can include the encrypted HPB data chunk in the response, and transmit the response to the host 102.

The host may receive at least one of the response RESPONSE, the response including the notice (RESPONSE WITH NOTICE) and the response including the map information (RESPONSE WITH MAP INFO.), which are transmitted by the memory system (step 842).

The host may verify whether the received response includes the notice (step 844). If the received response includes the notice (YES at step 844), the host can prepare to receive and store map information that can be delivered later (step 846). Thereafter, the host may check the response corresponding to a command previously transmitted to the memory system (step 852). For example, the host can check the response to confirm whether an operation corresponding to a command previously sent has succeeded or failed in the memory system.

When the received response does not include the notice (NO at step 844), the host may determine whether the response includes map information (step 848). When the response does not include map information (NO at step 848), the host may check the response corresponding to the command previously transmitted to the memory system (step 852).

When the received response includes the encrypted HPB data chunk (YES at step 848), the host may store the encrypted HPB data chunk included in the response within a storage space or update the encrypted HPB data chunk already stored in the storage space (step 850). Then, the host may check the response corresponding to the command previously transmitted to the memory system (step 852).

Figure 7:
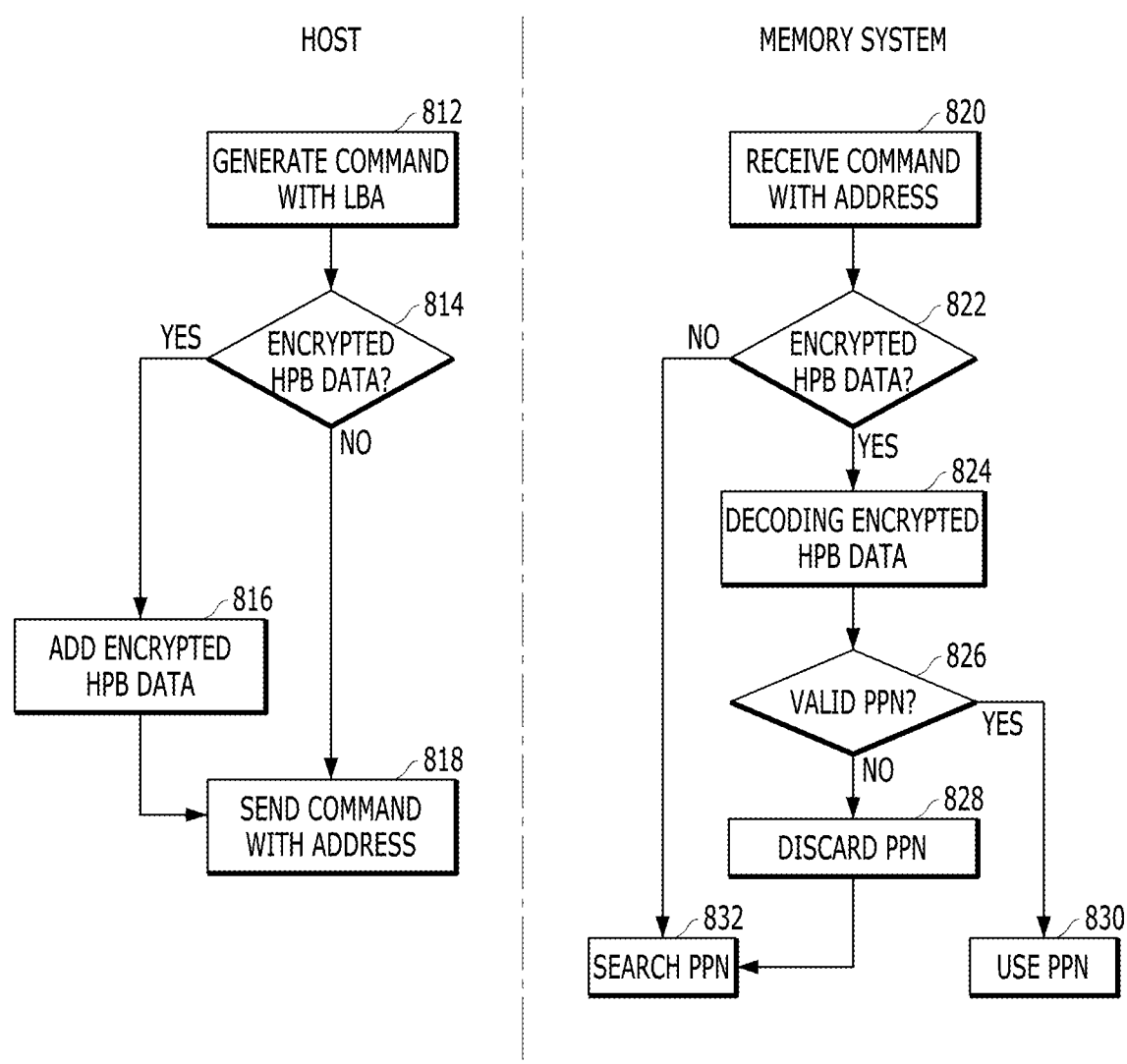
FIG. 7 illustrates an exemplary method of operation of a host and a memory system according to an exemplary embodiment of the disclosure.

FIG. 7 illustrates operations of a host and a memory system according to an exemplary embodiment of the disclosure. FIG. 7 illustrates detailed operations of the host transmitting a command and an encrypted HPB data chunk and the memory system receiving the command with the encrypted HPB data chunk, similar to the communication between the host 102 and the memory system 110 as described with reference to FIG. 6.

Referring to FIG. 7, the host may generate a command COMMAND including a logical address LBA (step 812). Thereafter, the host may check whether an encrypted HPB data chunk corresponding to the logical address LBA is in the map information (step 814). If there is no encrypted HPB data chunk (NO at step 814), the host may transmit a command COMMAND including the logical address LBA without the encrypted HPB data chunk (step 818).

On the other hand, if there is the encrypted HPB data chunk (YES at step 814), the host may add the encrypted HPB data chunk to the command COMMAND including the logical address LBA (step 816). The host may transmit the command COMMAND including the logical address LBA and the encrypted HPB data chunk (step 818).

The memory system may receive a command which is externally transmitted (step 822). The memory system may check whether the command is received with the encrypted HPB data chunk (step 824). When the command is not received with the encrypted HPB data chunk (NO in step 824), the memory system may perform a mapping operation or an address translation, e.g., search for a physical address corresponding to the logical address received with the command (step 832).

When the command is received with the encrypted HPB data chunk (YES at step 822), the memory system may decode the encrypted HPB data chunk check (step 824). The memory system may decode the encrypted HPB data chunk and check whether a physical address PPN included in the encrypted HPB data chunk is valid (step 826). Referring back to FIG. 6, the memory system has delivered the encrypted HPB data chunk to the host, and the host may perform the mapping operation based on the encrypted HPB data chunk delivered from the memory system so as to transmit the command with the encrypted HPB data chunk to the memory system. However, after the memory system transmits the encrypted HPB data chunk to the host, the host may change or update the encrypted HPB data chunk in the host memory. When map information is dirty, the encrypted HPB data chunk delivered from the host may not be used to access data as it is, so the memory system can determine whether a physical address PNN, obtained through a decoding operation on the encrypted HPB data chunk inputted with the command, is valid, i.e., whether map information corresponding to the encrypted HPB data chunk is changed or updated. When the physical address PNN received with the command is valid (YES at step 826), the memory system may perform an operation corresponding to the command using the physical address PNN (step 830).

When the physical address PNN inputted with the command is not valid (NO at step 826), the memory system may ignore the physical address PNN obtained from the encrypted HPB data chunk received with the command (step 828). In this case, the memory system may search for a physical address PNN based on the logical address LBA received with the command (step 832).

Figure 8:
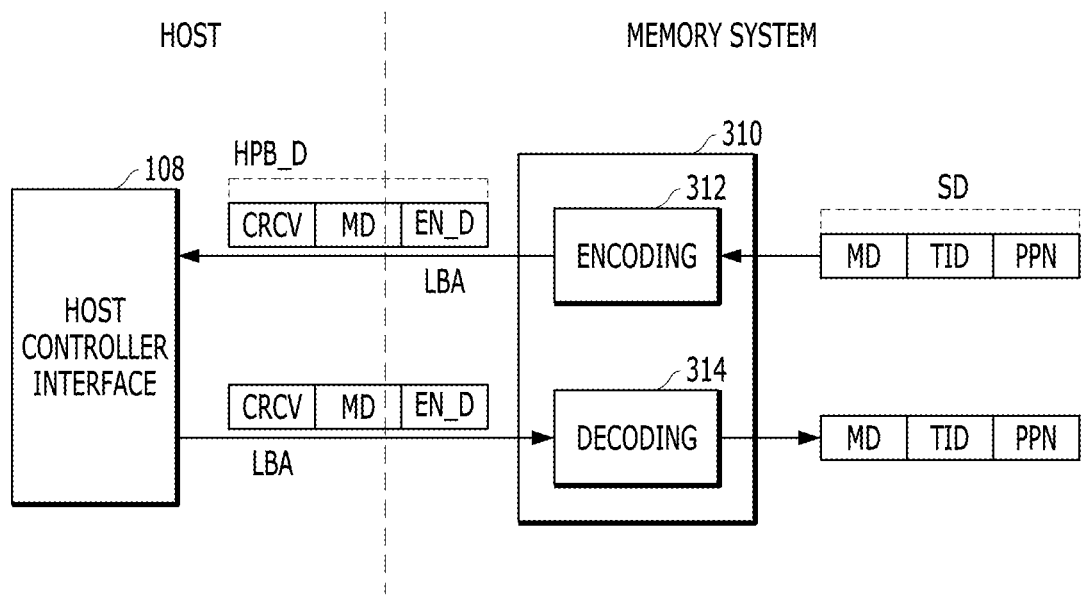
FIG. 8 illustrates an example of a transaction between a host and a memory system in a data processing system according to an exemplary embodiment of the disclosure.

FIG. 8 illustrates an example of a transaction between a host and a memory system in a data processing system according to an exemplary embodiment of the disclosure.

Referring to FIG. 8, the host performance booster (HPB) 130 included in the memory system 110 (shown in FIGS. 1 to 4) can encrypt a part of source data SD to generate an encrypted data chunk (HPB data), and transmit the encrypted data chunk (HPB data) to the host 102. The host 102 may store the encrypted data chunk output from the memory system 110 in a host memory H_MEM.

The source data SD may include mapping information or mapping data MD, mapping time data TD, and a physical page number PPN, which are generated and stored in the memory system 110. The mapping data MD may indicate the number of consecutive logical block addresses (LBAs) based on the physical page numbers PPN. The mapping time data TD may represent timing information regarding when the mapping data MD is generated. According to an embodiment, the mapping time data TD may be used as information for determining validity of the physical address PPN shown in FIG. 7. The physical page number PPN may be a kind of address indicating a location where data is stored through a program operation performed in the memory device 150. For example, when the host 102 transmits a program request along with data to the memory system 110, the memory system 110 selects at least one memory block among plural memory blocks included in the memory device 150, and programs the data at plural pages in one or more selected memory blocks. Accordingly, the physical page number PPN may include an address showing a specific memory block and a specific page in which a data chunk is stored. The logical block address LBA transmitted together with the encrypted data chunk (HPB data) is a kind of address used by the host 102. The logical address LBA can be associated with the physical page number (PPN) indicating a location in which a data chunk is stored.

Referring to FIG. 8, when a program operation requested by the host 102 is successfully completed, the memory system 110 recognizes a physical page number (PPN) in which a data chunk is programmed, maps (associates) a logical block address LBA to (with) the physical page number PPN to generate map data or map information, and transmits the map data or the map information to the host 102. In this case, the memory system 110 can transmit the map data or the map information, as well as various information related to address mapping, to the host 102.

In an embodiment, the memory system 110 transmits the mapping information MD, the mapping time data TD, the physical page number PPN, and the logical block address LBA to the host 102. Further, various other data can be transmitted from the memory system 110 to the host 102. Among them, because the logical block address LBA is a kind of data used by the host 102, the memory system 110 can output the logical block address LBA without encryption. However, because the mapping information MD, the mapping time data TD and the physical page number PPN are a kind of data used in the memory system 110, the memory system 110 can encrypt the mapping information MD, the mapping time data TD and the physical page number PPN and output encrypted data to the host 102.

Because some of these data may be used or utilized by the host 102, the memory system 110 according to an embodiment can encrypt a part of source data SD including the mapping information MD, the mapping time data TD and the physical page number PPN, but may or may not encrypt the remaining part of the source data SD. The remaining part can be transmitted as is to the host 102.

Depending on the specific implementation, the memory system 110 may not encrypt the mapping information MD, which the host 102 can use with the logical block address LBA. However, the memory system 110 can encrypt the mapping time data TD and the physical page number PPN and transmit encrypted data chunk. The host 102 may not decrypt the encrypted data chunk, but store the encrypted data chunk, as it is, based on decrypted data or unencrypted data such as the logical block address LBA and the mapping information MD. The host 102 can refer the logical block address LBA and the mapping information MD to add the encrypted data chunk to a read request before transmitting the read request to the memory system 110. For example, the memory system 110 selectively encrypts the mapping time data TD and the physical page number PPN in the source data SD and retains the mapping information MD as it is and outputs a partially encrypted data chunk to the host 102. In this case, the memory system 110 may perform a partial encryption operation to output an encrypted data chunk (HPB data) in which a part of the source data SD is encrypted.

The encrypted data chunk (HPB data) may include a cyclic redundancy check value CRCV, the mapping information MD, and encrypted data EN_D. Here, the encrypted data EN_D may include the mapping time data TD and the physical page number PPN which are encrypted. When the memory system 110 partially encrypts the source data SD and outputs the encrypted data chunk (HPB data) to the host 102, the logical block address LBA corresponding to the physical page number PPN is also transmitted to the host 102.

When the host 102 outputs a read request with a logical block address LBA to the memory system 110 for a read operation to obtain data corresponding to the logical block address LBA, an encrypted data chunk (HPB data) corresponding to the logical block address LBA may be output to the memory system 110. The memory system 110 may decode the encrypted data chunk (HPB data) to restore source data SD.

According to an embodiment, the host performance booster (HPB) 310 in the memory system 110 capable of performing the above-described partial encryption operation may include an encoder (e.g., encoding circuitry) 312 and a decoder (e.g., decoding circuitry) 314. The encoder 312 may encode a part of the source data SD to generate an encrypted data chunk (HPB data), and the decoder 314 may decode the encrypted data chunk (HPB data) to restore the source data (SD). Hereinafter, referring to FIGS. 9 to 14, the encoder 312 and the decoder 314 included in the host performance booster (HPB) 310 in the memory system 110 will be described in detail.

Figure 9:
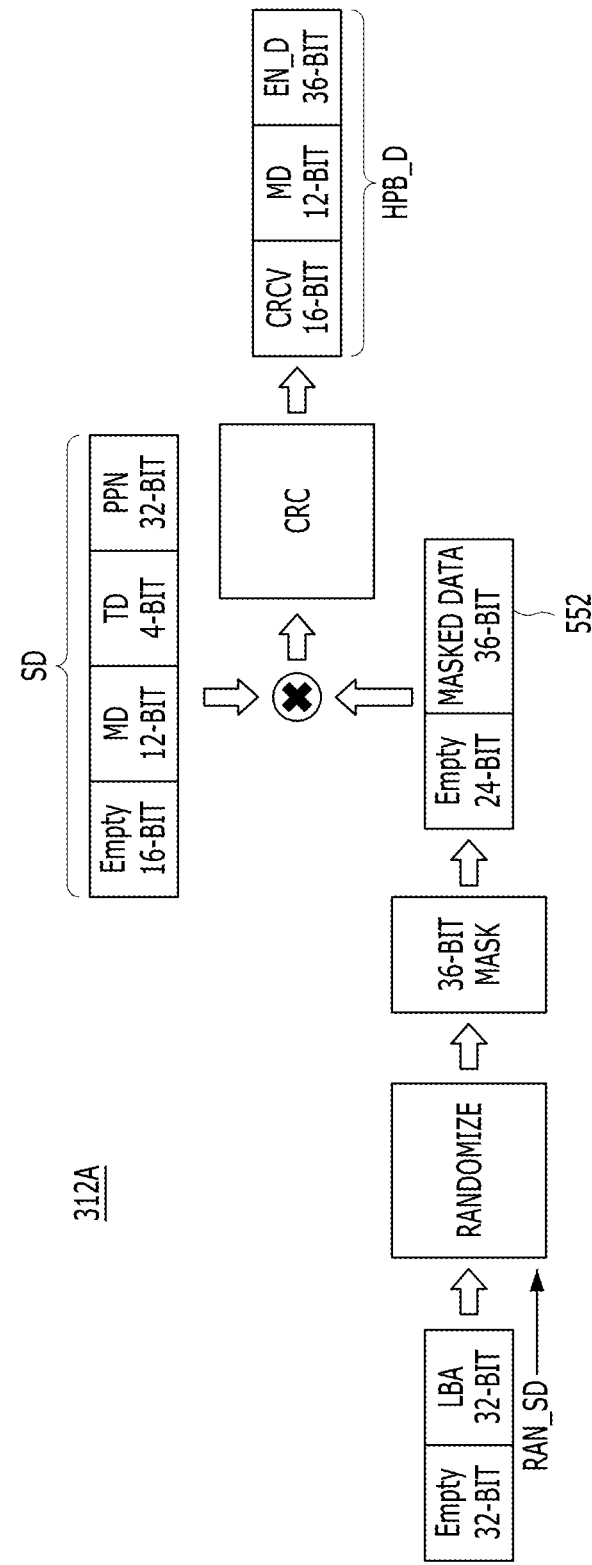
FIG. 9 shows a first data encoding operation performed in a memory system according to an exemplary embodiment of the disclosure.

FIG. 9 shows a first data encoding operation performed in a memory system according to an exemplary embodiment of the disclosure. The first data encoding operation 312A may be an example of operations performed by the encoder 312 described in FIG. 8.

Referring to FIG. 9, the encoder 312 may use source data SD and a logical block address LBA to encrypt mapping information. For example, the source data SD may include, for example, 12-bit mapping information MD, 4-bit mapping time data TD, and a 32-bit physical page number PPN. The logical block address can have a length of, for example, 32 bits. Bit information (length information) for plural pieces of data shown in FIG. 9 may vary according to an internal configuration of the memory system 110 or the memory device 150.

According to this exemplary embodiment, the first data encoding operation 312A can include a randomization process of generating a 64-bit random number based on a 32-bit logical address and a seed. The 64-bit random number is changed to 36-bit encrypted code 552 through a masking process. In this case, a 28-bit remaining part in the 64-bit random number may not be used. Herein, the 36-bit encryption code 552 is generated by the masking process because the 4-bit mapping time data (TD) and the 32-bit physical page number (PPN), which are portions to be encrypted, have a length of 36 bits.

Thereafter, a logical operation is performed on the 36-bit encrypted data 522 and 36-bit data (i.e., the 4-bit mapping time data TD and the 32-bit physical page number PPN of the source data SD). For example, the logical operation may be an exclusive OR (XOR) operation. A 36-bit encrypted data EN_D described in FIG. 8 may be generated through the exclusive OR (XOR) operation.

After the logical operation, the first data encoding operation 312A can include performing a cyclic redundancy check (CRC) to generate a 16-bit cyclic redundancy check result CRCV. The encrypted data chunk HPB_D can include the 16-bit cyclic redundancy check result CRCV as well as the unencrypted 12-bit mapping information MD and the 36-bit encrypted data EN_D generated through these processes. The 36-bit encrypted data EN_D described in FIG. 9 and the encrypted data EN_D described in FIG. 8 may be substantially the same.

Figure 10:
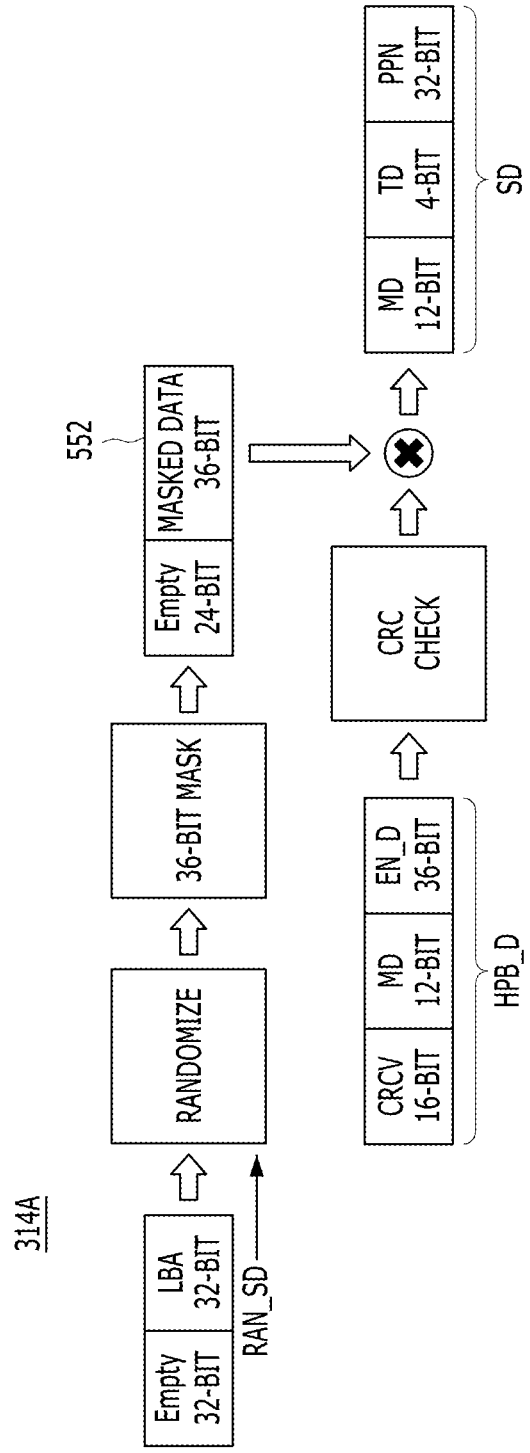
FIG. 10 shows a first data decoding operation performed in a memory system according to an exemplary embodiment of the disclosure.

FIG. 10 shows a first data decoding operation performed in a memory system according to an exemplary embodiment of the disclosure. The first data decoding operation 314A may be an example of operations performed by the decoder 314 described in FIG. 8.

Referring to FIG. 10, an encrypted data chunk (HPB data) and a logical block address LBA are input from the host 102 to the memory system 110. The memory system 110 may decode the encrypted data chunk (HPB data) by using the logical block address LBA transmitted from the host 102.

According to this exemplary embodiment, the first data decoding operation 314A can include a randomization process of generating a 64-bit random number based on a seed and the logical block address LBA transmitted from the host 102. The 64-bit random number is changed to a 36-bit encrypted code 552 through a masking process. In this case, a 24-bit remaining part in the 64-bit random number may not be used. In the first data decoding operation 314A like the first data encoding operation 312A, the 36-bit encrypted code 552 generated in the first data encoding operation 312A may be generated based on the logical block address LBA.

When an encrypted data chunk HPB_D including unencrypted 12-bit mapping information MD, 36-bit encrypted data EN_D and a 16-bit cyclic redundancy check value is received, the decoder 314 can perform a cyclic redundancy check (CRC). Through the cyclic redundancy check (CRC), it is possible to check whether the encrypted data chunk HPB_D is normally transmitted during the transmission/reception process (i.e., whether any error occurs in data transmission between the host 102 and the memory system 110).

When it is determined that there is no error in the encrypted data chunk HPB_D through the cyclic redundancy check, a logical operation is performed on the 36-bit encrypted code 552 and the 36-bit encrypted data EN_D included in the encrypted data chunk HPB_D. Here, the logical operation may be, for example, an exclusive OR (XOR) operation. Through an exclusive OR (XOR) operation, 4 bits of mapping time data (TD) and 32 bits of physical page number (PPN) can be decrypted from the 36-bit encrypted data EN_D.

Referring to FIGS. 9 and 10, the first data encoding operation 312A and the first data decoding operation 314A can utilize a randomization process performed on a logical block address to generate an encrypted code for each logical block address. Further, the first data encoding operation 312A and the first data decoding operation 314A can include a logical operation based on the encrypted code 552 corresponding to each logical address.

Referring to FIG. 9, the encrypted data chunk HPB_D transmitted to the host 102 may be generated by encrypting the mapping time data TD and the physical page number PPN based on the logical block address LBA. Further, because the encrypted data chunk HPB_D may include partially encrypted information as well as unencrypted information, the host 102 and the memory system 110 receiving the encrypted data chunk HPB_D may utilize the unencrypted information to recognize or decrypt the partially encrypted information. For example, the 12-bit mapping information MD may be used for the memory system 110 to recognize whether the physical address PPN input along with a current request or command is continuous in advance and prepare another operation corresponding to a next request or command.

The encrypted data chunk HPB_D associated with the logical address may include an error generated during an internal operation performed by the host 102. For example, partially encrypted information may be wrongly associated with a logical block address and included in the encrypted data chunk HPB_D. In the memory system 110 performing the first data encoding operation and the first data decoding operation described in FIGS. 9 and 10, the error might not be detected in a decoding process of the encrypted data chunk HPB_D. The host 102 may add a result of the cyclic redundancy check based on 12-bit mapping information MD and 36-bit encrypted data EN_D to the encrypted data chunk HPB_D and transmit the encrypted data chunk HPB_D with a corresponding logical block address to the memory system 110. Based on the result of the cyclic redundancy check, an error occurring in data communication between the host 102 and the memory system 110 can be detected and corrected. But, if the 12-bit mapping information MD or the 36-bit encrypted data EN_D is incorrectly matched and included corresponding to the logical block address, the error could not be checked by the cyclic redundancy check. In this case, if it is determined that a physical address secured through the decoding operation is the latest mapping information with reference to FIG. 7, the memory system 110 may malfunction in reading data using the physical address that is wrongly associated with the logical address.

In addition, in the first data encoding operation and the second decoding operation described in FIGS. 9 and 10, a 32-bit logical block address can be randomized to generate a 64-bit random number, and then a 28-bit random number of the 64-bit random number is not used through a masking operation, corresponding to the 36-bit encrypted data. Because some of the random numbers generated through the randomization process are not used, random characteristics that can be supported in the randomization process might not be fully utilized. If the random characteristics are weakened, the possibility that encrypted codes 552 corresponding to different logical block addresses may have the same value may increase. When the encrypted codes 552 corresponding to the different logical block addresses have the same value, encryption effect can be reduced.

Figure 11:
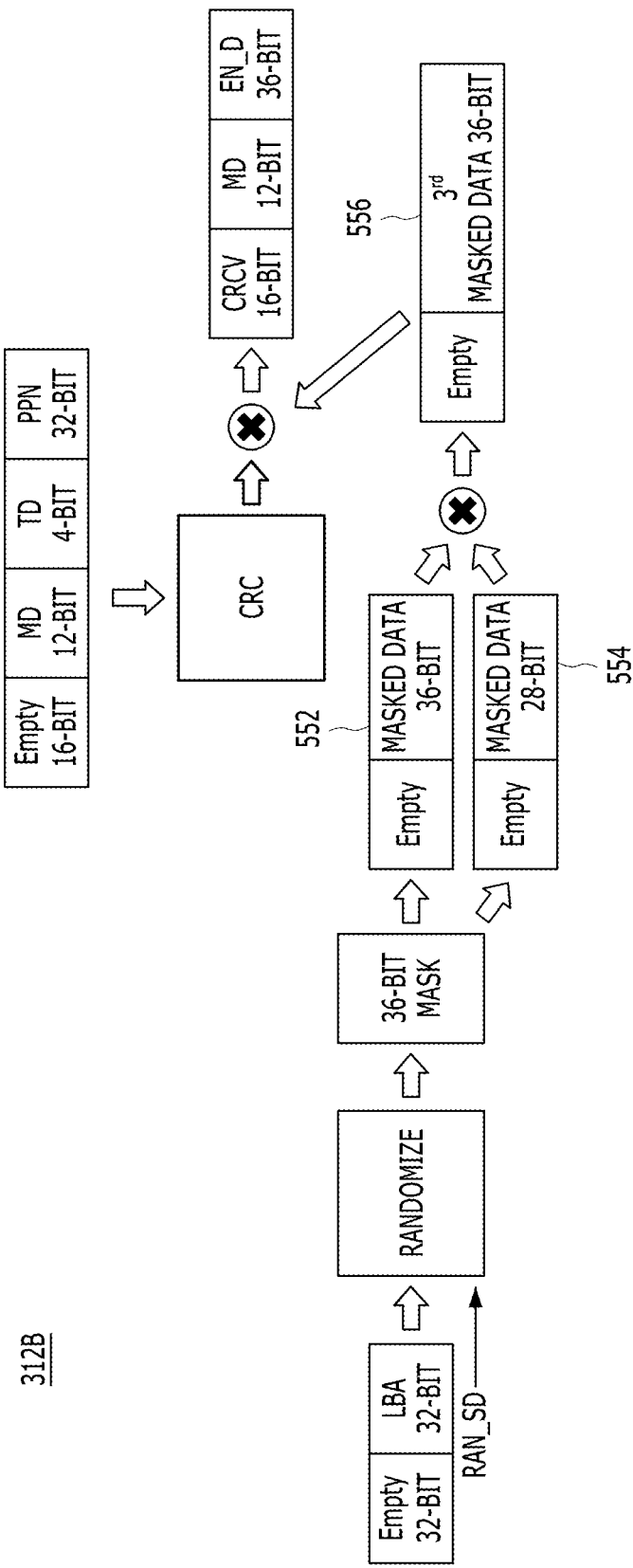
FIG. 11 shows a second data encoding operation performed in a memory system according to an exemplary embodiment of the disclosure.

FIG. 11 shows a second data encoding operation performed in a memory system according to another exemplary embodiment of the disclosure. The second data encoding operation 312B may be another example of operations performed by the encoder 312 described in FIG. 8.

In the exemplary embodiment shown in FIG. 11, the encoder 312 may use source data SD and a logical block address LBA to encrypt mapping information. For example, the source data SD may include 12-bit mapping information MD, 4-bit mapping time data TD, and a 32-bit physical page number PPN. The logical block address can have a length of 32 bits. Bit information (length information) for plural pieces of data shown in FIG. 11 may vary according to an internal configuration of the memory system 110 or the memory device 150.

In this example, the second data encoding operation 312B can include a randomization process of generating a 64-bit random number based on a 32-bit logical address and a seed. The 64-bit random number can be divided into a first 36-bit interim encrypted code 552 and a second 28-bit interim encrypted code 554 through a masking process. Thereafter, a logical operation may be performed on the first 36-bit interim encrypted code 552 and the second 28-bit interim encrypted code 554 to generate an encrypted code. Referring to FIG. 11, a logic operation such as an exclusive OR (XOR) operation is performed on the first 36-bit interim encrypted code 552 and the second 28-bit interim encrypted code 554 to generate a 36-bit third encrypted code 556. The masking process and the logical operation can generate the third 36-bit encrypted code 556, because the 4-bit mapping time data (TD) and the 32-bit physical page number (PPN), which are portions to be encrypted, have a length of 36 bits.

In the second data encoding operation 312B, a cyclic redundancy check is performed on source data (SD) including 12-bit mapping information MD, 4-bit mapping time data TD, and a 32-bit physical page number PPN to generate a result of the cyclic redundancy check.

Thereafter, a logical operation is performed on the third encrypted code 556 and the mapping time data TD and the physical page number PPN of the source data SD. Here, the logical operation may be, for example, an exclusive OR (XOR) operation. The encrypted data EN_D described in FIG. 8 may be generated through this exclusive OR (XOR) operation. The encrypted data chunk HPB_D can include the 16-bit cyclic redundancy check result CRCV as well as the unencrypted 12-bit mapping information MD and the 36-bit encrypted data EN_D generated through these processes. The 36-bit encrypted data EN_D described in FIG. 11 and the encrypted data EN_D described in FIG. 8 may be substantially the same.

Figure 12:
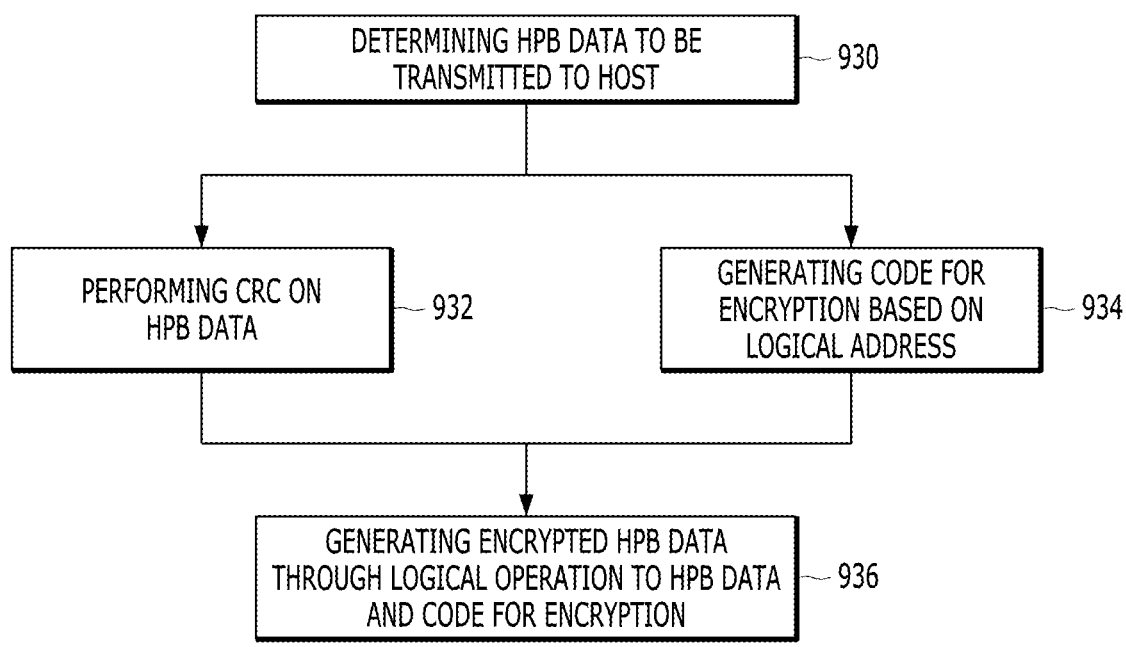
FIG. 12 shows a third data encoding operation performed in a memory system according to an exemplary embodiment of the disclosure.

FIG. 12 shows a third data encoding operation performed in a memory system according to yet another exemplary embodiment of the disclosure.

Referring to FIG. 12, the third data encoding method can include determining HPB data to be transmitted to the host (930), performing a cyclic redundancy check on the HPB data to be transmitted to the host (932), extracting an encrypted code based on a logical address (934), and performing a logical operation on the HPB data and the encrypted code to generate an encrypted HPB data chunk (936).

In this example, the extracting the encrypted code based on the logical address (934) may include the randomization process to generate the 64-bit random number based on the 32-bit logical address as described in FIG. 11, a masking process on the 64-bit random number to be divided into two interim encrypted codes, and a logical operation performed on the two interim encrypted codes to generate an encrypted code. To enhance random characteristics of the encrypted code, the third data encoding method may adopt a procedure using the all-bit random number shown in FIG. 11, rather than a procedure using a part of the random number generated through the randomization process shown in FIG. 9.

In addition, the logical operation can be performed on the HPB data and the encrypted code (936). The logical operation can be performed with respect to the third encrypted code 556 shown in FIG. 11 and the mapping time data TD and the physical page number PPN of the source data SD. The logical operation may include, for example, an exclusive OR (XOR) operation.

In the third data encoding method described in FIG. 12, when mapping information (i.e., HPB data) to be transmitted from the memory system 110 to the host 102 is determined, a cyclic redundancy check can be first performed on the mapping information before encoding or encrypting a part of the mapping information. But, in the first data encoding operation 312A described in FIG. 9, data is partially encrypted before the cyclic redundancy check is performed. That is, in the first data encoding operation 312A described in FIG. 9, the cyclic redundancy check is performed after partial encryption operation is performed on the mapping data. Due to this difference, an error checked by the memory system 110 for decoding the encrypted data chunk may be different.

Figure 13:
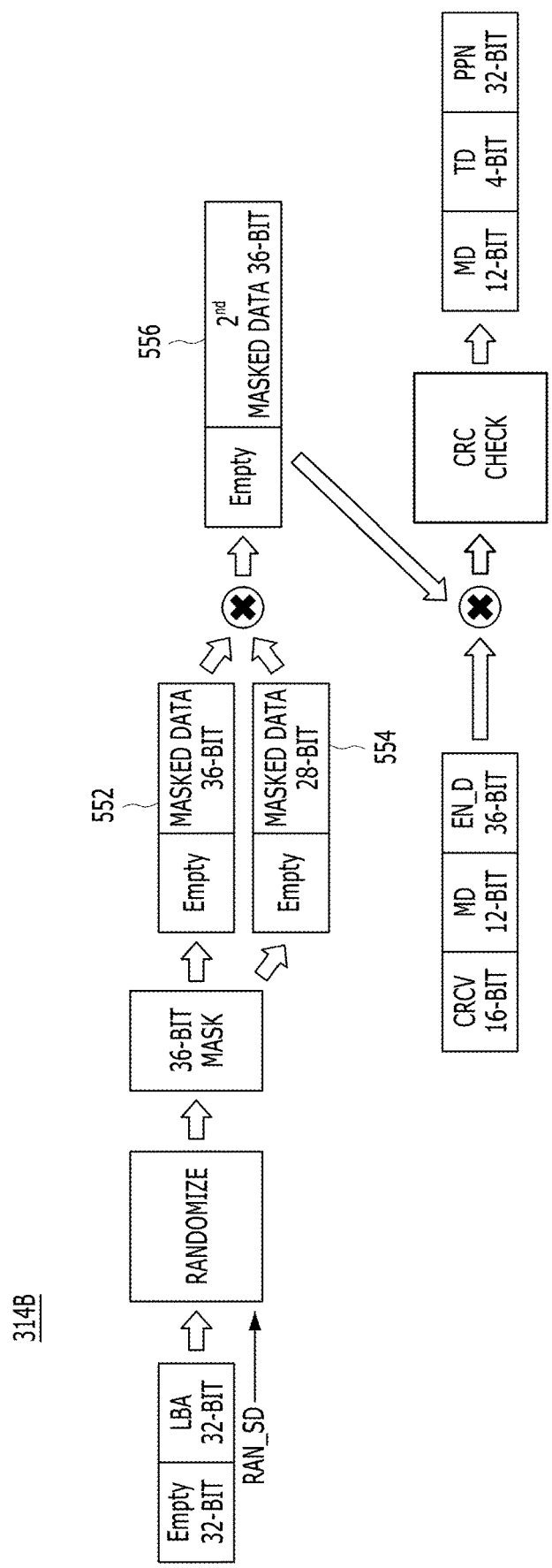
FIG. 13 shows a second data decoding operation performed in a memory system according to an exemplary embodiment of the disclosure.

FIG. 13 shows a second data decoding operation performed in a memory system according to another exemplary embodiment of the disclosure. The second data decoding operation 314B may be another example of operations performed by the decoder 314 described in FIG. 8.

Referring to FIG. 13, an encrypted data chunk (HPB data) and a logical block address LBA are input from the host 102 to the memory system 110. The memory system 110 may decode the encrypted data chunk (HPB data) by using the logical block address LBA transmitted from the host 102.

In this example, the second data decoding operation 314B can include a randomization process of generating a 64-bit random number based on a 32-bit logical address and a seed. The 64-bit random number can be divided into a first 36-bit interim encrypted code 552 and a second 28-bit interim encrypted code 554 through a masking process. Thereafter, a logical operation may be performed on the first 36-bit interim encrypted code 552 and the second 28-bit interim encrypted code 554 to generate an encrypted code. Referring to FIG. 13, a logical operation such as an exclusive OR (XOR) operation is performed on the first 36-bit interim encrypted code 552 and the second 28-bit interim encrypted code 554 to generate a 36-bit third encrypted code 556. The masking process and the logical operation can generate the third 36-bit encrypted code 556, because the 4-bit mapping time data (TD) and the 32-bit physical page number (PPN), which are portions to be encrypted, have a length of 36 bits.

Unlike the first data decoding operation 314A described in FIG. 10, the second data decoding operation 314B described in FIG. 13 is does not discard a part of the 64-bit random number generated by the randomization process. All-bit random number can be changed with two interim codes and the two interim codes can be used as inputs for the exclusive OR (XOR) operation. The random characteristics of the third encrypted code 556 may be enhanced compared to that of the first encrypted data 552 shown in FIG. 10.

The second data decoding operation 314B may perform a logical operation on the third encrypted data 556 and the 36-bit encrypted data EN_D in the encrypted data chunk HPB_D. In this case, the logical operation may include, for example, an exclusive OR (XOR) operation. Through the logical operation, the memory system 110 can decrypt and obtain the 4-bit mapping time data TD and the 32-bit physical page number PPN from the encrypted data EN_D.

Thereafter, the decoder 314 may perform a cyclic redundancy check (CRC). Through the cyclic redundancy check (CRC), it is possible not only to check whether the encrypted data chunk HPB_D has been normally transmitted during the transmission/reception process, but also to check the association between the logical block address, input along with the encrypted data chunk HPB_D, and the 32-bit physical page number PPN. The cyclic redundancy check (CRC) performed in the first data decoding operation 314A described in FIG. 10 can confirm whether there is an error in the transmission and reception of the encrypted data chunk HPB_D between the host 102 and the memory system 110. However, when the encrypted data chunk HPB_D, which is associated with a specific logical block address to be transmitted to the memory system 110, is incorrectly matched due to an error in an internal operation performed in the host 102, it is difficult for the memory system 110 to check the association between the logical block address and the encrypted data chunk HPB_D. In the second data decoding operation 314B described in FIG. 13, however, the cyclic redundancy check is performed on 4-bit mapping time data TD and 32-bit physical page number PPN instead of the 36-bit encrypted data EN_D. Because the cyclic redundancy check (CRC) is directly performed on the 32-bit physical page number PPN, the memory system 110 can check whether the 32-bit physical page number PPN is associated with the logical block address through a single cyclic redundancy check (CRC).

When the association between the 32-bit physical page number PPN and the logical block address is confirmed through the cyclic redundancy check (CRC), the memory system 110 is configured to determine validity of the 32-bit physical page number PPN, i.e., whether the 32-bit physical page number PPN is the latest, based on the 4-bit mapping time data TD corresponding to the 32-bit physical page number PPN.

Figure 14:
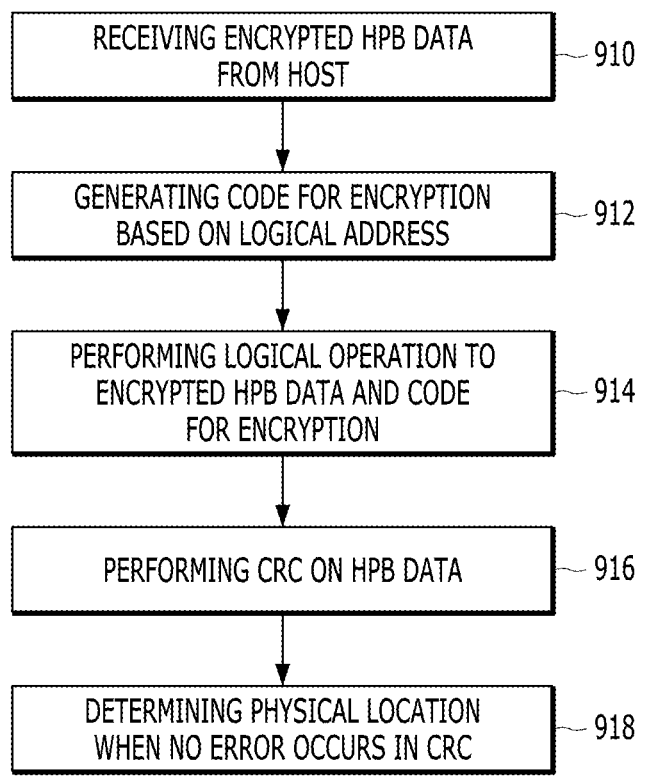
FIG. 14 shows a third data decoding operation performed in a memory system according to an exemplary embodiment of the disclosure.

FIG. 14 shows a third data decoding operation performed in a memory system according to another exemplary embodiment of the disclosure. According to an embodiment, the third data decoding operation may show specific processes (824) for decoding the encrypted HPB data chunk described in FIG. 7.

Referring to FIG. 14, the third data decoding operation can include receiving an encrypted HPB data chunk input from a host (910), generating an encrypted code based on a logical block address (912), logically calculating the encrypted HPB data chunk and the encrypted code (914), and performing a cyclic redundancy check on HPB data (916), and determining a physical location when there is no error in the cyclic redundancy check (918).

The third data decoding operation may begin with the memory system 110 receiving the encrypted HPB data chunk delivered from the host 102 (910). The encrypted HPB data chunk may be input to the memory system 110 along with a logical block address and a request or command (e.g., a read request). Thereafter, the decoder 314 in the memory system 110 may decode the encrypted HPB data chunk.

The memory system 110 may generate an encrypted code based on a logical block address associated with the encrypted HPB data chunk (912), which is similar as in the third data encoding operation. The encrypted code is generated based on a logical block address. The encrypted code may be generated through a randomization process, a masking process and a logical operation described in FIG. 13 according to an embodiment.

In the third data decoding operation, the encrypted code is generated, and then an encrypted part of the encrypted HPB data chunk may be decrypted or decoded based on the encrypted code. Decryption of the encrypted part in the encrypted HPB data chunk can be achieved through a simple logical operation using the encrypted code (914).

After decoding the encrypted part in the encrypted HPB data chunk to generate decrypted data, the decoder 314 may perform a cyclic redundancy check (916) on the decrypted data including the 32-bit physical page number PPN. Because of performing a cyclic redundancy check after decrypting the encrypted part in the encrypted HPB data chunk, the memory system 110 can check whether the decrypted data is related to the logical block address (that is, whether the descripted physical page number PPN is associated with the logical address). When there is no error through the cyclic redundancy check, the decoder 314 may determine the physical page number PPN input from the host 102 as a physical location for data corresponding to an input request or command.

A memory system and a data processing system according to various embodiments of the disclosure improves security for data transmission within the data processing process.

In addition, the memory system according to embodiments of the disclosure can reduce overhead by identifying an error during a data decode process, and thus can improve operation performance (e.g., input/output performance) of the memory system.

While the present teachings have been explained and described with respect to specific embodiments, it will be apparent to those skilled in the art in light of the present disclosure that various alternatives, changes and modifications may be made without departing from the spirit and scope of the disclosure as defined in the following claims.

What is claimed is:

1. A controller coupled to a non-volatile memory device and a host, wherein the controller is configured to perform a cyclic redundancy check on map data associated with user data stored in the memory device, generate an encryption code based on a logical address included in the map data, generate encrypted data through a logical operation on the encryption code and the map data, and transmit the encrypted data to the host, wherein the map data may be partially or entirely encrypted by an encryption code that is generated by randomizing the logical address, extracting first encryption data by a masking process performed on the logical address, and performing a logical operation on the first encryption data and second encryption data corresponding to a remaining part excluding the first encryption data extracted through the masking process.

2. The controller according to claim 1, wherein the map data includes a physical address indicating a location where the user data is stored in the memory device.

3. The controller according to claim 2, wherein the map data may be partially or entirely encrypted, and wherein the encrypted data includes a result of a cyclic redundancy check, the logical address and the physical address, and wherein the result of the cyclic redundancy check and the physical address are encrypted through a logical operation.

4. The controller according to claim 3, wherein the controller is configured to decrypt the encrypted data when receiving the encrypted data and the logical address input along with a read request from the host.

5. The controller according to claim 4, wherein the controller is configured to decrypt the encrypted data to determine both whether the encrypted data includes an error and whether the encrypted data is associated with the logical address.

6. The controller according to claim 1, wherein the encrypted data includes time information associated with the map data, and the time information and the map data are encrypted with the encryption code through the logical operation.

7. A controller coupled to a host, wherein the controller is configured to receive encrypted data input from the host, generate an encryption code based on a logical address input along with the encrypted data, perform a logical operation on the encryption code and the encrypted data to obtain a map data, and perform a cyclic redundancy check on the map data to determine whether the map data is valid, wherein the encryption code is generated by randomizing the logical address, extracting first encryption data by a masking process performed on the logical address and performing the logical operation on the first encryption data and second encryption data corresponding to a remaining part excluding the first encryption data extracted through the masking process.

8. The controller according to claim 7, wherein the map data includes a physical address indicating a location where a user data is stored in a non-volatile memory device, and the controller is configured to use the physical address to read the user data and transfer the user data to the host.

9. The controller according to claim 8, wherein the encrypted data includes a result of the cyclic redundancy check, the logical address and the physical address, and the result of the cyclic redundancy check and the physical address are encrypted through the logical operation.

10. The controller according to claim 7, wherein the encrypted data includes time information associated with the map data, and the time information and the map data are encrypted with the encryption code through the logical operation.

11. The controller according to claim 7, wherein the controller is configured to determine both whether the encrypted data includes an error and whether the encrypted data is associated with the logical address, through the cyclic redundancy check.

12. The controller according to claim 7, wherein the controller is configured to transmit the encrypted data, including a map data chunk associated with a user data chunk stored in a non-volatile memory device, to the host.

13. A memory system, comprising:
a nonvolatile memory device storing a user data chunk; and
a controller configured to encrypt a map data chunk including a physical address associated with the user data chunk stored in the non-volatile memory device, and transmit to a host, or receive from the host, encrypted data,
wherein the controller is further configured to perform a cyclic redundancy check to determine whether the physical address corresponds to a logical address associated with the user data chunk, and
wherein the controller is further configured to generate an encryption code for encoding or decoding the map data chunk, wherein the encryption code is generated by randomizing the logical address, extracting first encryption data by a masking process performed on the logical address and performing the logical operation on the first encryption data and second encryption data corresponding to a remaining part excluding the first encryption data extracted through the masking process.

14. The memory system according to claim 13, wherein the controller comprises:
an encoder configured to perform a cyclic redundancy check on a map data chunk associated with a user data chunk stored in the non-volatile memory device, generate an encryption code based on a logical address included in the map data chunk, and generate encrypted data through a logical operation on the encryption code and the map data chunk; and
a decoder configured to generate an encryption code based on a logical address input along with the encrypted data, perform a logical operation on the encryption code and the encrypted data to obtain a map data chunk, and perform a cyclic redundancy check on the map data chunk.

15. The memory system according to claim 14, wherein the encrypted data includes time information associated with the map data chunk, and the time information and the map data chunk are encrypted with the encryption code through the logical operation.

16. The memory system according to claim 13, wherein the encrypted data includes a result of the cyclic redundancy check, the logical address and the physical address, and the result of the cyclic redundancy check and the physical address are encrypted through the logical operation.

17. The memory system according to claim 13, wherein the controller is configured to, when receiving the encrypted data input along with a read request and the logical address from the host, perform an operation corresponding to the read request based on a physical address obtained from the encrypted data.

* * * * *